United States Patent [19]

Sawtell et al.

[11] Patent Number: 5,085,526
[45] Date of Patent: Feb. 4, 1992

[54] COMPACT PROGRAMMABLE TEMPERATURE DETECTOR APPARATUS

[75] Inventors: Carl K. Sawtell, San Jose; Marc E. Dagan, Mountain View; Frederic S. Bandy, Milpitas, all of Calif.

[73] Assignee: Astec International, Ltd., Hong Kong

[21] Appl. No.: 558,820

[22] Filed: Jul. 26, 1990

[51] Int. Cl.$^5$ .......................... H01K 3/08; H03K 5/26
[52] U.S. Cl. ..................... 374/101; 307/310; 374/170; 374/183
[58] Field of Search ............... 374/101, 178, 163, 170, 374/183; 307/355, 360, 310

[56] References Cited

U.S. PATENT DOCUMENTS

| H562 | 12/1988 | Trachier et al. | 374/101 |
|---|---|---|---|
| 4,198,676 | 4/1980 | Varnum et al. | |
| 4,471,354 | 9/1984 | Smith | |
| 4,673,300 | 6/1987 | Wilhelmson et al. | |
| 4,698,655 | 10/1987 | Schultz | |
| 4,838,707 | 6/1989 | Ozawa et al. | |
| 4,868,417 | 9/1989 | Jandu | 307/355 |
| 4,900,952 | 2/1990 | Hosotani et al. | 307/355 |
| 4,907,117 | 6/1990 | Pease et al. | |

FOREIGN PATENT DOCUMENTS 264228  11/1986  Japan ................................. 374/101

OTHER PUBLICATIONS

Brokaw, A. P., "A Simple Three-Terminal IC Bandgap Reference", IEEE Journal of Solid-State Circuits, vol. 8C-9, Dec., 1974.
Pease, R. A., "A Fahrenheit Temperature Sensor", IEEE International Solid State Circuits Conference, Feb., 1984.

Primary Examiner—Daniel M. Yasich
Attorney, Agent, or Firm—McCubbrey, Bartels, Meyer & Ward

[57] ABSTRACT

A programmable temperature detector for simple detection applications is described. The programmable temperature detector has three terminals and a plurality of temperature-transitions points from which to choose. A first terminal receives power from a supply, a second terminal receives a ground reference, and a third terminal provides an indication of an object's temperature crossing a selected temperature-transition point. The desired temperature transition point is specified by a single non-precision resistor coupled in series with the power terminal of the detector. The non-precision resistor and a power supply set a program signal, in the form of a current, into the power terminal of the detector. The programmable temperature detector comprises circuitry for quantizing the program signal into a discrete signal level and for selecting a temperature transition point in response.

25 Claims, 10 Drawing Sheets

COMPACT PROGRAMMABLE TEMPERATURE DETECTOR APPARATUS

FIELD OF THE INVENTION

The present invention relates to the detection of temperature transitions points and, more particularly, to a circuit which detects a plurality of distinct temperature transition points.

BACKGROUND OF THE INVENTION

Generic applications of temperature detectors range from the quantitative measurement of temperature to the generation of an alarm signal when the temperature of an object goes above or below a predetermined level. The latter application area is of great interest to the electronics industry where it is essential to provide fail-safe features in electronic equipment. Such applications are numerous and include power supply systems, computer equipment, television sets, stereo equipment, heating appliances and the like.

Given the wide range of application areas for reliable and precise temperature detectors, product manufacturers often have a supply of several different temperature detectors, such as bi-metallic switches, thermistors, and semiconductor integrated-circuit temperature detectors. Since precision bi-metallic detectors are manufactured to pre-determined temperature transition points with fixed mechanical structures, a product manufacturer must stock different switches for different temperature-detection applications. This, coupled with the expense of bi-metallic switches, adds greatly to the inventory costs for product manufacturers.

Thermistor devices provide a less expensive and more flexible alternative to bi-metallic switches. Thermistors, however, must be configured with additional precision components. Typically, the additional components are precision resistors and a comparator, which are configured into a Wheatstone bridge. Although the additional components reduce inventorying costs by allowing thermistors to be configured for different temperature-transition points, they increase manufacturing costs by increasing component count.

A partial solution to the increased component cost of using thermistors has been provided by semiconductor integrated-circuit (IC) temperature detectors, which integrate some of the above components onto a single chip. These IC temperature detectors generally have four terminals: an input terminal for receiving a stable reference voltage, an output terminal for transmitting a detection signal, a power terminal and a ground terminal. An example of such an IC detector is the LM3911 Temperature Controller manufactured by National Semiconductor Corporation, which will be discussed in greater detail below. However, to provide the stable reference voltage required by such an IC temperature detector, the user must configure precision resistors and additional components around the IC detector.

The above prior art examples are generally directed towards detecting a specific transition point in temperature, such as that which occurs in the over-heating of electrical equipment. Another branch of the prior art related to the present invention is generally directed towards temperature-control systems for house and office environments. Recently, digital electronics have been incorporated into thermostat-control units to allow the user to digitally set the temperature of the house or office environment to within one degree Fahrenheit. Such a digital thermostat-control unit comprises a temperature sensor, a means for generating a plurality of temperature-transition points, a digital data bus comprising several lines for receiving a program code for selecting one of the temperature-transition points, and means for comparing the temperature-sensor signal against the selected temperature-transition point.

Such digital thermostat units provide the flexibility of multiple transition points needed in the area of temperature detectors. They, however, require the generation of program signals for the digital data bus. The generation of such program signals increases the manufacturing costs.

In summary, there is a great need for flexible temperature detector that may be configured, with a minimum of terminals and with the aid of relatively inexpensive and non-precision external components, for a multitude of temperature ranges and applications.

SUMMARY OF THE INVENTION

Broadly, the present invention encompasses means for programming a temperature detector having a plurality of programmable temperature-transition points with a minimum of non-precision external components.

The programmable temperature detector of the present invention preferably comprises a first terminal and a second terminal with the programmable temperature detector being powered by applying a potential difference between the first and second terminal. The present invention further includes means for generating a plurality of signal pairs, each said pair comprising a first signal related to temperature and a second signal specifying a temperature transition point. The present invention further includes reference comparison means for sensing a program signal on the first terminal, for selecting one of the signal pairs in response to the sensed program signal, and for generating a comparison signal related to the difference of the first and second signals of the selected signal pair.

Accordingly, it is an object of the present invention to provide a reliable and precise temperature detector that may be easily configured with the aid of inexpensive and non-precision components for a variety of applications, thereby reducing manufacturing costs, decreasing manufacturing response time to consumer demand, and lowering new product introduction time.

It is another object of the present invention to provide a programmable temperature detector that is precise, compact, inexpensive, and flexible in application use.

It is still another object of the present invention to provide a precise temperature detector that functions without the need for external precision components nor precise supply voltages.

It is yet another object of the present invention to provide a three-terminal temperature detector integrated on a single semiconductor chip which is precise, inexpensive, flexible in use, and is easily programmed.

These and other objects of the present invention will become apparent to those skilled in the art from the following detailed description of the invention and from the accompanying drawings.

DETAILED DESCRIPTION OF THE INVENTION

The present invention provides a programmable temperature detector for simple detection applications which has only three device terminals and yet has a plurality of temperature-transition points from which to choose. The temperature transition point is specified by a single non-precision resistor. The present invention may be better appreciated and comprehended from a more detailed description of the two prior art areas most closely related to the present invention. These areas are IC temperature detectors and digital thermostat-control units.

Figure 1:
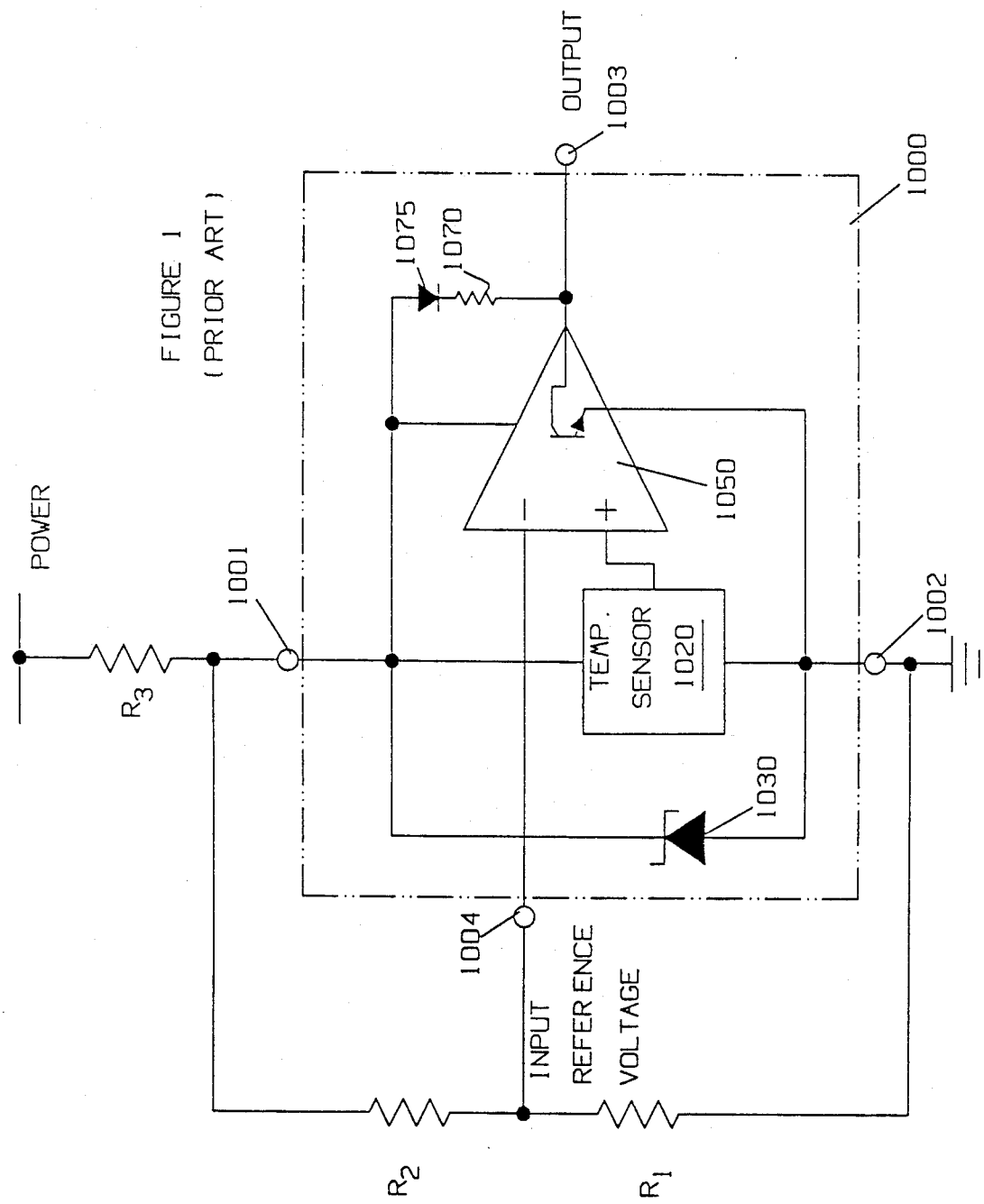
FIG. 1 is a block diagram of an exemplary integrated-circuit temperature controller/detector according to the prior art.

An exemplary IC detector is provided by the LM3911 Temperature Controller manufactured by National Semiconductor Corporation. A circuit diagram of the LM3911 Temperature Controller is shown at 1000 in FIG. 1. Controller 1000 comprises a power terminal 1001, a ground terminal 1002, and an input terminal 1004 for receiving a stable reference voltage. Controller 1000 further comprises a Temperature Sensor 1020 for generating a voltage related to temperature and an operational amplifier 1050 for comparing the input reference voltage at terminal 1004 and the voltage from Temperature Sensor 1020. Amplifier 1050 provides an output signal related to the difference of these two signals, thereby indicating a crossing of the temperature-transition point. The output signal is coupled to an output terminal 1003. Controller 1000 further comprises a shunt reference for clamping the potential difference between terminals 1001 and 1002 to 5.8 V, and a pull-up circuit comprising resistor 1070 and diode 1075 for providing power to the open-collector output of amplifier 1050.

In general, Controller 1000 is configured for detecting a temperature-transition point with two precision resistors R1 and R2 and one non-precision resistor R3. A voltage divider is formed by connecting Resistor R1 between terminals 1004 and 1002 and by connecting resistor R2 between terminals 1004 and 1001. Due to the precision resistance values of resistors R1 and R2 and to the shunt voltage between terminals 1001 and 1002, a relatively stable reference voltage is provided to input terminal 1004. The configuration of Controller 1000 is completed by connecting resistor R3 between power terminal 1001 and an available voltage source having a value greater than 5.8 V. The resistance value of resistor R3 is chosen so that a minimum current of 1.0 mA is directed towards power terminal 1001 by the available voltage source.

Given the flexibility in choosing the resistances for precision resistors R1 and R2, Controller 1000 may be configured to detect a wide range of temperature transition points. Controller 1000 provides, therefore, the flexibility of multiple transition points needed for wide range of manufacturing applications. It, however, requires at least three external components which increase component costs, inventorying costs, and printed-circuit board costs.

Figure 2:
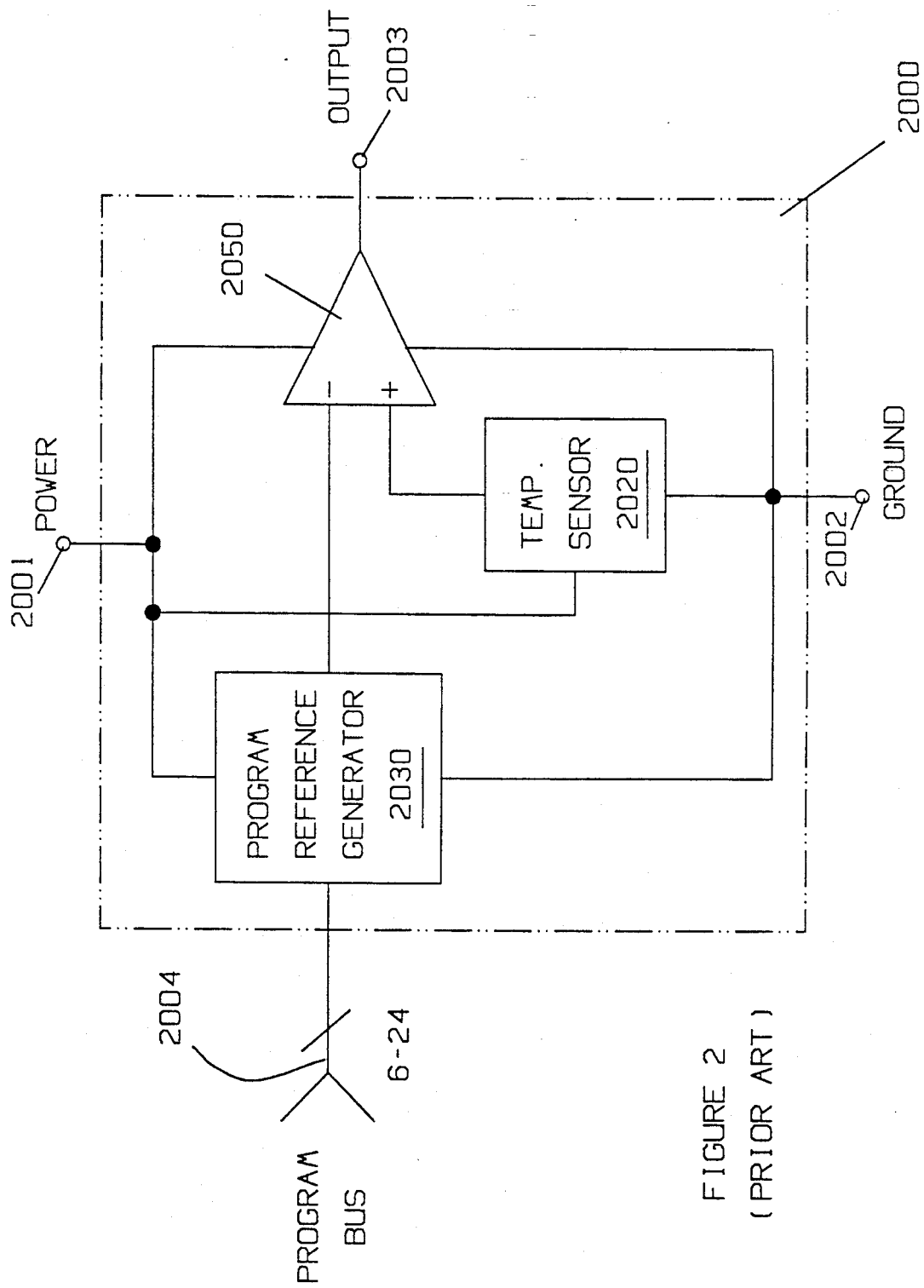
FIG. 2 is a block diagram of an exemplary digitally controlled thermostat unit for controlling household and office temperatures according to the prior art.

In the prior art area of digital thermostat-control units, the block diagram for a generic example of digitally controlled thermostat unit is shown at 2000 in FIG. 2. Thermostat unit 2000 comprises a power terminal 2001, a ground terminal 2002, a temperature sensor 2020 generating a voltage related to temperature, and a operational amplifier 2050 for comparing the voltage from temperature sensor 2020 against a reference voltage.

Thermostat unit 2000 further comprises a Programmable Reference Generator 2030 for generating a plurality of voltage signals, one for each degree Fahrenheit over a particular range, for transmitting one of the voltage signals to operational amplifier 2050. Programmable Reference Generator 2030 is responsive to a digital program bus provided at a bus port 2004 for the selection of a voltage signals for transmission. The digital program bus is like that which may be found in a microcomputer system and may contain between 6 and 24 digital-signal lines, depending on whether both address and data lines are provided to Thermostat Unit 2000. In the former case, only data lines are provided to Thermostat Unit 2000 where the binary value encoded on the data lines represents one of the voltage reference levels. In the latter case, address lines are added to selectively address Thermostat Unit 2000 within a standard computer architecture.

Thermostat Unit 2000 provides the flexibility of multiple transition points needed for wide range of manufacturing applications. It, however, requires the generation of program signals for the program bus, which increases its costs. In using Thermostat Unit 2000 as simple temperature detector, the data lines of the program bus can be 'hard-wired' to the appropriate power and ground signals to select the desired temperature-transition point. The multitude of digital-signal lines, however, increases the package size of the temperature detector, thereby increasing packaging costs and printed-circuit board costs.

In contrast to the prior art, the present invention provides a programmable temperature detector for simple detection applications which has only three device terminals and yet has a plurality of temperature-transition points to choose from. The present invention further provides a means for choosing one of the plurality of temperature-transition points by configuring the programmable temperature detector with only one non-precision resistor.

Figure 3:
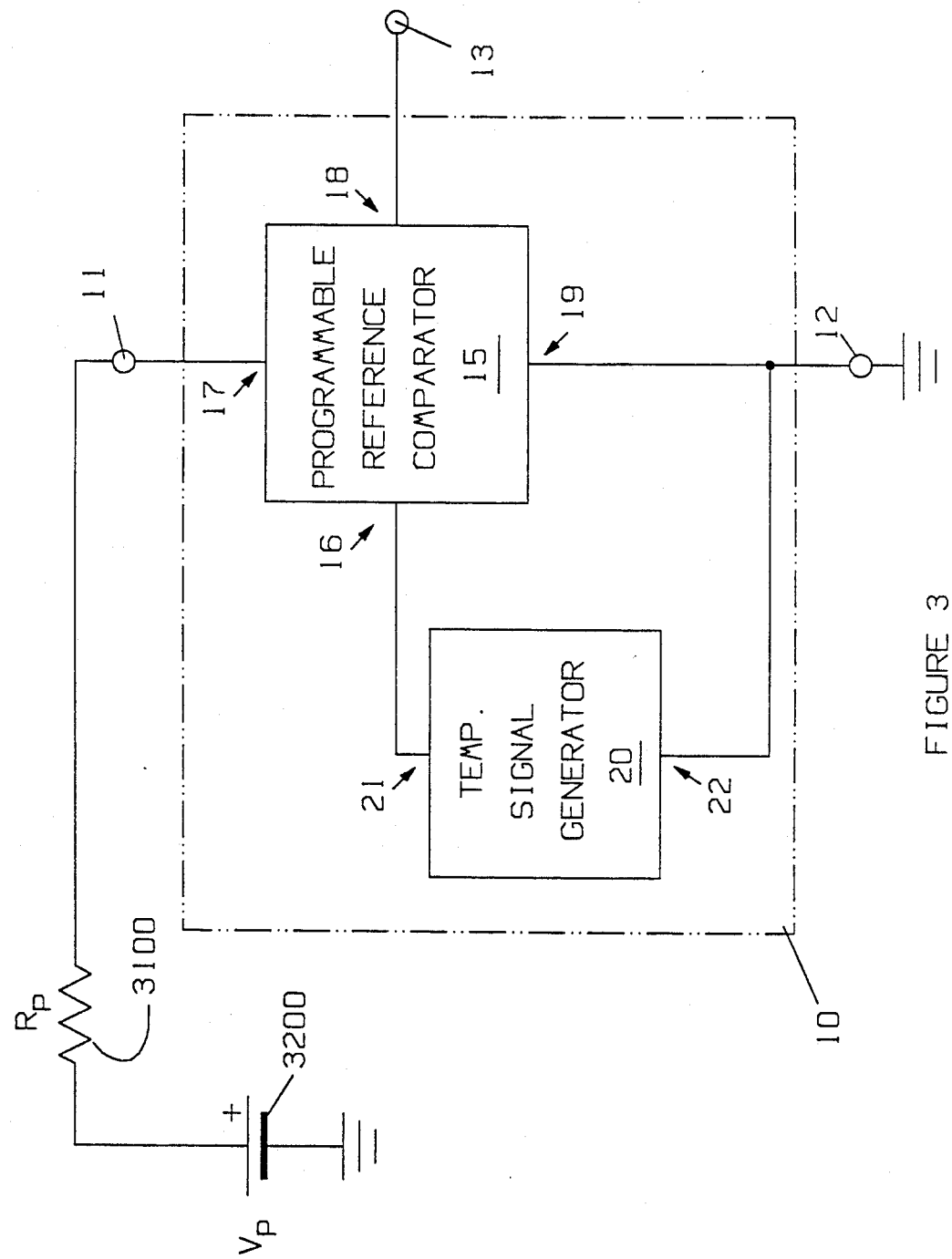
FIG. 3 is a block diagram of a first embodiment of the Programmable Temperature Detector according to the present invention.

A first embodiment of the programmable temperature detector according the present invention is shown at 10 in FIG. 3. Programmable Temperature Detector 10 includes a first terminal 11 for receiving a source of electrical power, a second terminal 12 for receiving a ground reference potential, and a third terminal 13 for providing an output indicating the detection of a predetermined temperature-transition point by Programmable Temperature Detector 10. The present invention senses the temperature of a quantity and provides an indication when the value of the sensed temperature crosses a comparison reference temperature. Additionally, the present invention enables the selection of the comparison reference temperature from a plurality of predetermined reference temperatures. The selection of the comparison reference temperature is provided by a program signal coupled onto first terminal 11, along with the source of power for Programmable Temperature Detector 10. Hereafter, the terms comparison reference temperature and selected reference temperature are synonymous and refer to the temperature-transition point used by the present invention to generate the output indication.

In the preferred embodiment, a desired temperature-transition point is selected by setting the current into first terminal 11 within a corresponding sub-range of values. For example, a current level between 1.0 mA and 2.0 mA may represent a first temperature-transition point of 20° C. and a current level between 2.0 mA and 3.0 mA may represent a second temperature-transition point of 30° C. The preferred embodiment further comprises shunt means for clamping the potential between terminals 11 and 12 to a predetermined value so that a simple series combination of a program resistor 3100 and a program voltage 3200 may be used to set the current to a desired sub-range. For example, the shunt means may clamp the potential difference between terminals 11 and 12 to 2.5 V, thus allowing a current of 2.5 mA to be coupled terminal 11 with a program voltage of 5 V and a program resistance of 1 k ohm, thereby selecting a temperature-transition point of 30° C.

The present invention, therefore, provides a three-terminal temperature detector that may be programmed to sense a desired temperature-transition point by setting the current into first terminal 11 within the corresponding sub-range. It may be appreciated that the span of each sub-range allows the use of non-precision resistors and voltage sources in setting the current into first terminal 11, thereby reducing inventorying and manufacturing costs. It may be appreciated that the present invention may be integrated onto a single semiconductor chip to provide a small thermal mass and, hence, fast thermal responsiveness. It may be further appreciated that the compact size of the present invention in combination with a minimal number of terminals substantially reduces packaging costs.

Programmable Temperature Detector 10 comprises a Temperature Signal Generator 20 for generating a signal related to temperature and a Programmable Reference Comparator 15 for comparing the signal from Temperature Signal Generator 20 to a selected reference signal. Temperature Signal Generator 20 generates an electrical signal, either in the form of a voltage or current, in response to its temperature. The electrical signal is hereafter referred to as the temperature signal of Temperature Signal Generator 20. Temperature Signal Generator 20 comprises a first terminal 21 for transmitting the temperature signal and a second terminal 22 coupled to second terminal 12 for receiving a ground reference.

Programmable Reference Comparator 15 comprises a plurality of predetermined reference signals corresponding to a plurality of predetermined temperature-transition points and means for selecting one of the reference signals as a comparison reference. Programmable Reference Comparator 15 further comprises means for comparing the temperature signal against the selected reference signal, thereby detecting a desired temperature-transition point. In addition, Programmable Reference Comparator 15 comprises means for receiving power from first terminal 11 and for distributing power to the components of Programmable Temperature Detector 10. Structurally, Programmable Reference Comparator 15 comprises a port 16 coupled to port 21 for receiving the temperature signal, a power/program port 17 coupled to first terminal 11 for receiving power and program signals, a ground port 19 coupled to second terminal 12 for receiving a ground reference, and an output port 18 couple to third terminal 13.

One preferred embodiment of a Temperature Signal Generator 20 according to the present invention comprises a two-terminal device which thermo-electrically generates a potential across terminals 21 and 22 (thermoelectric effect) in response to an applied temperature. An example of such a two terminal device is a thermo-couple constructed from two dis-similar materials such as Antimony and Bismuth. In such a thermo-couple device, a metallurgical junction of the two materials is formed with a terminal provided on each material. Such two-terminal devices, however, are not easily or economically included in the fabrication of integrated-circuits. Three-terminal alternatives are commonly employed which include a third terminal for receiving a source of power. Such three-terminal temperature sensors as well as other two-terminal temperature sensors are well known to the art and will be discussed in more detail below.

Figure 4:
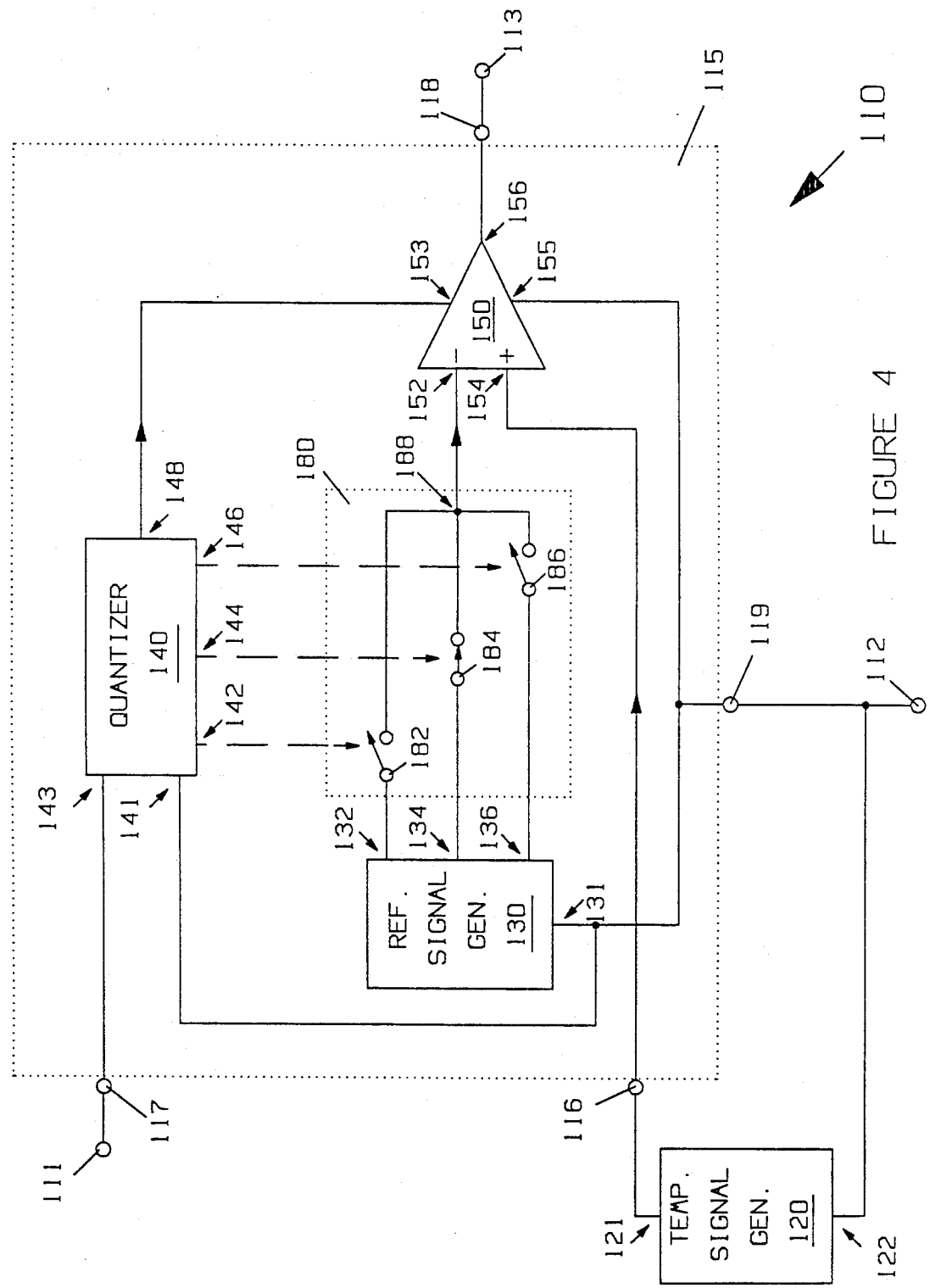
FIG. 4 is a block diagram of a second embodiment of the Programmable Temperature Detector according to the present invention.

A second embodiment of a programmable temperature detector according to the present invention is shown at 110 in FIG. 4. Programmable Temperature Detector 110 includes a first terminal 111 for receiving a source of electrical power, a second terminal 112 for receiving a ground reference potential, and a third terminal 113 for providing an output indicating the detection of a predetermined temperature-transition point by Programmable Temperature Detector 110.

The temperature sensing of Programmable Temperature Detector 110 is provided by Temperature Signal Generator 120, which generates a signal related to temperature. The signal is hereafter referred to as the temperature signal of Temperature Signal Generator 120. Temperature Signal Generator 120 comprises a first terminal 121 for transmitting the temperature signal and a second terminal 122 coupled to second terminal 112 for receiving a ground reference.

Programmable Temperature Detector 110 further comprises a Programmable Reference Comparator, shown at 115 in FIG. 4, for comparing the temperature signal against a selected reference signal. Programmable Reference Comparator 115 is similar in nature to Programmable Reference Comparator 15, shown in FIG. 3. Structurally, Programmable Reference Comparator 115 comprises a port 116 coupled to port 121 for receiving the temperature signal, a power/program port 117 coupled to first terminal 111 for receiving power and program signals, a ground port 119 coupled to second terminal 112 for receiving a ground reference, and an output port 118 couple to third terminal 113.

Programmable Reference Comparator 115 includes a reference signal generator, shown at 130 in FIG. 4, for generating a plurality of predetermined electronic reference signals. Each of these reference signals corresponds to a predetermined reference temperature that may be selected as the comparison reference temperature. Reference Signal Generator 130 comprises a port 131 for receiving a ground reference and three ports 132, 134, and 136 for providing reference signals, respectively. The illustration of three such reference signals is not a limitation of the present invention and, as known to a practitioner of ordinary skill in the art, any number of such reference signals may be generated and used by the present invention.

Additionally, the reference signals provided by Reference Signal Generator 130 may be in the form of currents or in the form of voltages. The form of the reference signal is preferably the same form as the temperature signal provided by Temperature Signal Generator 120, thereby allowing a comparison of signals within a common metric.

It may be appreciated that the reference signals may be generated in a number of different ways. For example, a plurality of two-terminal thermo-couple devices having different temperature coefficients and offsets may be used. Additionally, the temperature characteristics for each such device must be different from that of Temperature Signal Generator 120 so as to provide points of intersection between the temperature signal and the plurality of reference signals. The difference in temperature coefficients may, for example, be generated by varying the metallurgical composition of the junction materials. An example for generating reference signals that is more suitable for present integrated-circuit fabrication technology is a voltage divider network, as well known to the art. Such a voltage divider requires a source of power and it may be appreciated that Reference Signal Generator 130 may further comprise an additional port for receiving power. A preferred embodiment of Reference Signal Generator 130 is illustrated and discussed in greater detail below.

Programmable Reference Comparator 115 further includes a comparison means, shown at 150 in FIG. 4, for comparing the temperature signal from Temperature Signal Generator 120 and a selected one of the reference signals from Reference Signal Generator 130. The latter signal herein referred to as the comparison reference signal or the selected reference signal. Comparator 150 may comprise a current differential amplifier, as when the above signals are in the form of currents, or a voltage differential amplifier, as when the above signals are in the form of voltages. Comparator 150 preferably includes an inverting input port 152 for receiving the comparison reference signal and a noninverting port 154 for receiving the temperature signal. Comparator 150 includes a positive supply terminal 153 for receiving a source of power and a negative supply terminal 155 coupled to ground via second terminal 112.

Comparator 150 further includes an output port 156, which provides a signal having a first output state when the temperature signal is less than the selected reference signal and a second output state when the temperature signal is greater than the selected reference signal. It may be appreciated by a practitioner of ordinary skill in the art that the coupling of input signals to Comparator 150 is arbitrary in light of the particular detection function being performed by Comparator 150. It may further be appreciated that the temperature signal of Temperature Signal Generator 120 may be coupled to inverting input 152 and that the selected reference signal may be coupled to non-inverting input 154.

In general, comparator 150 may be designed to associate a particular range of voltages, or alternatively currents, to the first and second output states. A common practice in the art is to select an output transition point, for example 1.0 V or 0.0 mA, and associate all output values below the transition point with the first state and all output values above the transition point with the second state. The association is arbitrary and may be reversed by associating all output values below the transition point with the second state and all output values above the transition point with the first state.

Another common practice in the art of providing output signals is to modulate the conductance of a transistor element, such as a Metal-Oxide-Semiconductor Field-Effect Transistor (MOSFET) or a Bipolar-Junction Transistor (BJT). Again, a transition point is defined in terms of conductance and the conductance of the transistor between its primary conduction terminals above the transition point is associated with one state and the conduction below the transition point is associated with the other state. For the MOSFET example given above, the primary conduction terminals are the source and drain terminals and, for the BJT example, the primary conduction terminals are the emitter and collector terminals.

As typically done in the art, Comparator 150 may further include means for generating a region of high-gain centered about the transition point (i.e., a nonlinear transfer function) and/or means for generating a region of hysteresis centered about the transition point. Both the high-gain and hysteresis means provide a greater distinction between the first and second states and a greater immunity to noise effects. Both the high-gain means and hysteresis means are well known in the solid-state circuit art and may be accomplished, for example, with non-linear switching devices and Schmitt-trigger circuits, respectively.

Programmable Reference Comparator 115 further includes a quantizing means, shown at 140 in FIG. 4, for sensing a program signal present on first terminal 111 and for selecting one of the reference signals as the comparison reference signal to be coupled as an input to Comparator 150. Quantizer 140 provides the means of configuring Programmable Reference Comparator 115 to detect a specified temperature-transition point, as measured by Temperature Signal Generator 120, and is a key aspect of the present invention. In general, Quantizer 140 decodes a plurality of predetermined program signals, or codes, present on first terminal 111 and, in response to sensing one of the predetermined program signals, selects one of the reference signals as the comparison reference signal.

Quantizer 140 comprises a port 143 for receiving power and program signals from first terminal 111, a port 141 for receiving a ground reference via second terminal 112, and a port 148 for supplying power internally to Programmable Temperature Detector 110. Quantizer 140 further comprises three selection ports 142, 144, and 146 for selecting a reference signal corresponding to program signal present on first terminal 111. It may be appreciated that Quantizer 140 may comprise more selection ports corresponding to additional temperature-transition points. It may be further appreciated that the illustration of three selection ports 142, 144, and 146 is intended to facilitate the description of Quantizer 140 and is not intended as a limitation of the present invention.

As known in the art, a number of communication formats may be used to set the form of the predetermined program signals. In the simplest of communication formats, a set of voltages, a set of currents, or a set of power levels may be used. In the first case, a voltage of 2.5 V applied between the first and second terminals may represent a first program signal, a voltage of 2.75 V may represent a second program signal, a voltage of 3.00 V may represent a third, and so on. In the second example of current format, the set of currents (1.0 mA, 2.0 mA, 3.0 mA, . . . ) may represent individual program signals. In the case of the power level format, the set of power levels (2.5 mW, 5.0 mW, 7.5 mW, . . . ) may represent the individual program signals. It may be appreciated that the selection of particular voltage, current and power levels is not strict and depends upon the desired noise-immunity and interface levels desired by the designer. It may be further appreciated that the present invention provides a tolerance window about each voltage, current, or power level to provide noise insensitivity and other advantages discussed below.

In the preferred embodiments of the present invention, the energy of the program signals is, in part, used to power the components of Programmable Temperature Detector 110. The energy is provided at port 148 of Quantizer 140, as needed, to the components of Programmable Temperature Detector 110. Comparator 150, for example, couples power from port 148 via positive supply terminal 153. In the preferred embodiments, the minimum energy require by the present invention determines the lowest level of voltage, current or power that may be used it indicate a program signal.

In some implementations of the preferred embodiments of the present invention, it may be preferable to couple power to certain internal components of Detector 110 directly from first terminal 111 rather than from port 148 of Quantizer 140. The amount of power coupled from first terminal 111 is typically small in comparison to the minimum power required by Detector 110 and has a predictable nature. The predictable nature may, for example, be in the form of an absolute amount of voltage, current, or power provided to first terminal 111 or may be in the form of a fixed percentage thereof. In implementations where the direct coupling of power from first terminal 111 to internal components affects the detection of program signals by Quantizer 140, the implementation of Quantizer 140 will need to reflect the effects of direct coupling. For example, if Programmable Temperature Detector 110 is designed to detect current-program signals from the set (1.0 mA, 2.0 mA, 3.0 mA) and if a constant current of 0.025 mA is directly coupled from first terminal 111 to an internal component, then the implementation of Quantizer 140 must be designed to detect current-program signals from the set (0.075 mA, 0.175 mA, 0.275 mA). It may be appreciated that the above considerations are applicable to all embodiments of the present invention.

In light of the above discussion, it may be appreciated that more complex communication formats may be used to represent the program signals. For example, alternating voltage or current signals may be used where the frequency of the alternating characteristic may be used to encode the individual program signals. Also, an amplitude-modulated, alternating voltage or current may be used where the amplitude may be used to encode the individual program signals. Additionally, pulse-encoding techniques may be used to communicate the program signals (i.e. the number of distinct pulses or phase-reversals received in a predetermined time span).

Programmable Reference Comparator 115 further comprises a reference switch means, shown at 180 in FIG. 4, for selecting one of the reference signals as the comparison, or selected, reference signal. Comparison Switch Means 180 is responsive to Quantizer 140 via selection ports 142, 144, and 146 and includes a first switch 182, a second switch 184, a third switch 186, and an output port 188.

First switch 182 is a single-pole-single-throw switch having a first terminal coupled to port 132 of Reference Signal Generator 130 and a second terminal coupled to output port 188, and is responsive to Quantizer 140 via selection port 142. Second switch 184 is a single-pole-single-throw switch having a first terminal coupled to port 134 of Reference Signal Generator 130 and a second terminal coupled to output port 188, and is responsive to Quantizer 140 via selection port 144. Third switch 186 is a single-pole-single-throw switch having a first terminal coupled to port 136 of Reference Signal Generator 130 and a second terminal coupled to output port 188, and is responsive to Quantizer 140 via selection port 146. It may be appreciated that Comparison Switch Means 180 may contain additional switches for additional reference signals provided by Reference Signal Generator 130 or, in the alternative, may contain only two switches in the case that only two temperature-transition points are used by Programmable Temperature Detector 110.

If the reference signals from Reference Signal Generator 130 take the form of voltage levels, Comparison Switch Means 180 is operated by Quantizer 140 such that at most one of the switches of Comparison Switch Means 180 (e.g., at most one of switches 182, 184 and 186) is closed. In the case where the reference signals from Reference Signal Generator 130 take the form of current levels, Comparison Switch Means 180 is operated by Quantizer 140 such that any of switches of Comparison Switch Means 180 (e.g., any of switches 182, 184, and 186) may be closed. If the references signals may be in the form of binary-weighted current units and may be combined to provide $2^N$ possible values for the comparison reference signal, where N is the number of switches in Comparison Switch Means 80. For the particular case of three switches, eight values for the comparison reference signal are possible.

Figure 5:
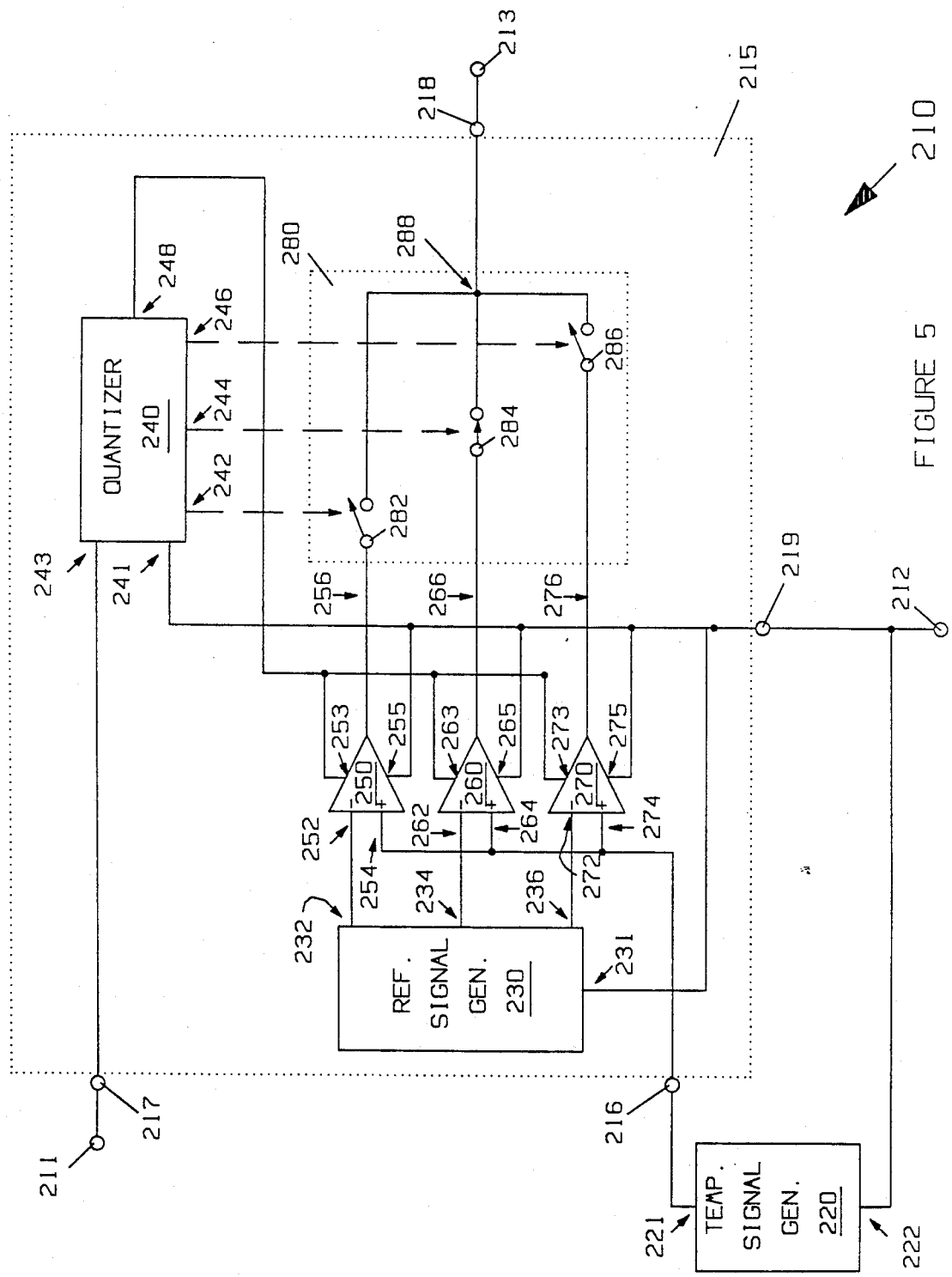
FIG. 5 is a block diagram of a third embodiment of the Programmable Temperature Detector according to the present invention.

In the second embodiment of the present invention, as shown by Programmable Temperature Detector 110 of FIG. 4, the comparison means of the present invention used a single comparator element: Comparator 150. Alternatively, a plurality of comparator elements may be used in the present invention. A third embodiment of the present invention which utilizes multiple comparators is shown in FIG. 5 at 210. Programmable Temperature Detector 210 shown in FIG. 5 includes a first terminal 211 for receiving a source of electrical power, a second terminal 212 for receiving a ground reference potential, and a third terminal 213 for providing an output indicating the detection of a predetermined temperature-transition point by Programmable Temperature Detector 210.

Programmable Temperature Detector 210 further comprises a Temperature Signal Generator 220 for generating a signal related to temperature. Temperature Signal Generator 220 includes a port 221 for transmitting the temperature signal and a port 222 for receiving a ground reference. The signal is hereafter referred to as the temperature signal of Temperature Signal Generator 220.

Programmable Temperature Detector 210 further comprises a Programmable Reference Comparator 215 for comparing the temperature signal against a selected reference signal. Programmable Reference Comparator 215 is similar in nature to Programmable Reference Comparator 15, shown in FIG. 3. Structurally, Programmable Reference Comparator 215 comprises a port 216 coupled to port 221 for receiving the temperature signal, a power/program port 217 coupled to first terminal 211 for receiving power and program signals, a ground port 219 coupled to second terminal 212 for receiving a ground reference, and an output port 218 coupled to third terminal 213.

Programmable Reference Comparator 215 includes a Reference Signal Generator 230, similar to Reference Signal Generator 130 shown in FIG. 4, for generating a plurality of predetermined electronic reference signals. Each of these reference signals corresponds to a predetermined reference temperature that may be selected as the comparison reference temperature. Reference Signal Generator 230 comprises a port 231 for receiving a ground reference and three ports 232, 234, and 236 for providing reference signals, respectively. The illustration of three such reference signals is not a limitation of the present invention and, as known to a practitioner of ordinary skill in the art, any number of such reference signals may be generated and used by the present invention.

Programmable Reference Comparator 215 includes a Quantizer 240 similar to Quantizer 140 shown in FIG. 4. Quantizer 240 comprises a port 243 for receiving power and program signals from first terminal 211, a port 241 for receiving a ground reference via second terminal 212, and a port 248 for supplying power internally to Programmable Temperature Detector 210. Quantizer 240 further comprises three selection ports 242, 244, and 246 for selecting a reference signal corresponding to program signal present on first terminal 211. It may be appreciated that Quantizer 240 may comprise more selection ports corresponding to additional temperature-transition points. The illustration of three selection ports 242, 244, and 246 is intended to facilitate the description of Quantizer 240 and is not intended as a limitation of the present invention.

Programmable Reference Comparator 215 includes a Comparison Switch Means 280 similar to Comparison Switch Means 180 shown in FIG. 4. Comparison Switch Means 280 is responsive to Quantizer 240 via selection ports 242, 244, and 246 and includes a first switch 282, a second switch 284, a third switch 286, and an output port 288.

The comparison means of Programmable Reference Comparator 215, however, comprises a plurality of comparators. For the purpose of discussion, three such comparators are shown in FIG. 5 at 250, 260 and 270. It may be appreciated that the demonstration of Comparators 250, 260 and 270 does not limit the present invention to three comparators. Each of Comparators 250, 260, and 270 is identical to Comparator 150 and may comprise either a current differential amplifier or a voltage differential amplifier. Additionally, each of Comparators 250, 260, 270 further comprises an output-transition point, and may comprise one or more of the following: means for providing a region of high-gain centered about its output-transition point and means for providing a region of hysteresis centered about its output-transition point.

Comparator 250 includes an inverting input port 252, a non-inverting input port 254 and an output port 256. Comparator 250 includes a positive supply terminal 253 coupled to port 248 for receiving a source of power and a negative supply terminal 255 coupled to ground via second terminal 212. Likewise, Comparator 260 has an inverting input port 262, a non-inverting input port 264 and an output port 266. Comparator 260 includes a positive supply terminal 263 coupled to port 248 for receiving a source of power and a negative supply terminal 265 coupled to ground via second terminal 212. Likewise, Comparator 270 has an inverting input port 272, a non-inverting input port 274 and an output port 276. Comparator 270 includes a positive supply terminal 273 coupled to port 248 for receiving a source of power and a negative supply terminal 275 coupled to ground via second terminal 212.

In contrast to the second embodiment of the present invention shown by Programmable Temperature Detector 110 of FIG. 4, Comparators 250, 260, and 270 of Programmable Temperature Detector 210 are positioned before Comparison Switch Means 280 such that output 256, 266, and 276 are coupled to switches 282, 284, and 286, respectively. Output 288 of Comparison Switch Means 280 is coupled to third terminal 213 and the temperature signal of Temperature Signal Generator 220 is coupled via port 221 to non-inverting input ports 254, 264 and 274 of Comparators 250, 260, and 270, respectively. The reference signals from ports 232, 234, and 236 of Reference Signal Generator 230 are coupled to inverting inputs 252, 262, and 272, respectively.

First switch 282 is responsive to Quantizer 240 via selection port 242. Second switch 284 is responsive to Quantizer 240 via selection port 244. Third switch 286 is responsive to Quantizer 240 via selection port 246. It may be appreciated that Comparison Switch Means 280 may contain additional switches for additional comparison signals generated by additional comparators or may contain two switches in the case where two reference signals are provided by Reference Signal Generator 230.

In contrast to the operation of Comparison Switch Means 180 in Programmable Reference Comparator 115 shown in FIG. 4, the operation of Comparison Switch Means 280 in Programmable Reference Comparator 215 shown in FIG. 5 is limited. At most, only one of switches 282, 284 and 286 may be closed. The selected comparator output defines the comparison reference signal and corresponding temperature-transition point for Programmable Temperature Detector 210. It may be appreciated that in Programmable Reference Comparator 215, binary-weighted currents cannot be combined at output 288 to provide $2^N$ possible values for the comparison reference signal, where N is the number of switches in Comparison Switch Means 280.

An additional disadvantage of Programmable Reference Comparator 215 vis-a-vis Reference Comparator 115 is the additional expense of Comparators 260 and 270. Programmable Reference Comparator 215, however, has an important advantage in that any noise of the switches and any variations in switch parameters with respect to temperature are prevented from interfering with the comparison of the reference signals from Reference Signal Generator 230 and the temperature signal from Temperature Signal Generator 220. This is particularly important when it is essential to produce a temperature detector whose detection characteristics are stable with respect to temperature and switch-parameter variations.

An alternative approach to selecting the comparator outputs of Programmable Reference Comparator 215 is to selectively couple power to one of Comparators 250, 260, and 270. In this alternative approach, Comparators 250, 260, and 270 comprise "open collector"-type outputs which may be coupled together and coupled to third terminal 213. Comparison Switch Means 280 is then used to selectively couple power to Comparators 250, 260 and 270. This approach provides the advantage of lower power dissipation and, in an integrated-circuit environment, allows a more compact layout as the transistor components of the comparators, Comparison Switch Means 280, and portions of Quantizer 240 may be merged together.

To more fully understand the aspects of the present invention, preferred embodiments for Temperature Signal Generators 20, 120, 220, Reference Signal Generators 130, 230, and Quantizers 140, 240 are now provided. These preferred embodiments will aid skilled practitioners in practicing the present invention.

Figure 6:
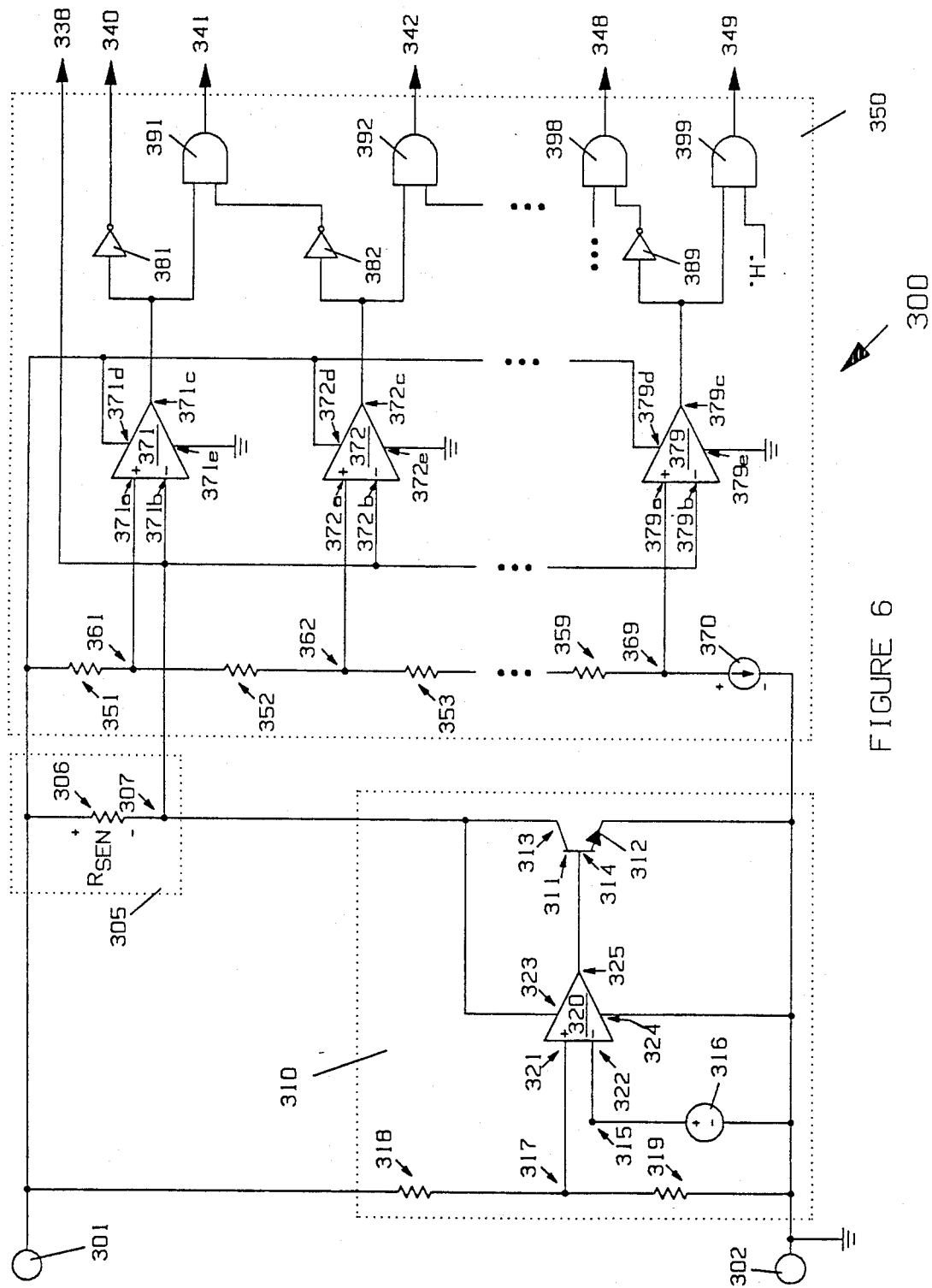
FIG. 6 is a circuit diagram of the preferred embodiment of a Quantizer according to the present invention.

An exemplary embodiment of Quantizers 140 and 240, as shown in FIGS. 4 and 5, is shown at 300 in FIG. 6. Quantizer 300 comprises a first terminal 301 for receiving primary power, a second terminal 302 for receiving a ground reference, a sense means 305 for sensing program signals, a shunt means 310 for clamping the potential difference between first terminal 301 and second terminal 302 to a predetermined value, digitizing means 350 for converting the program signal from an analog form to a digital form, and an internal-supply terminal 338 for supplying power to selected components of Quantizer 300 and other components of Programmable Temperature Detectors 110 and 210. Sense means 305 comprises a sense node 307 and a sense resistor 306 coupled between first terminal 301 and sense node 307. Sense node 307 is coupled to internal-power supply terminal 338 as well as shunt means 310 and digitizing means 350.

One objective of Quantizer 300 is to fix the voltage between first terminal 301 and second terminal 302 at, for example, 2.5 V and thereby allow the user to send a program signal in the form of a current. A minimum current is required for the operation of Programmable Temperature Detectors 110 and 210, with excess current being shunted to ground via shunt means 310. The current required in the operation of Programmable Temperature Detectors 110 and 210 flows from sense node 307 to internal-power supply node 338 and the excess current is passes through a transistor 311 of shunt means 310. In this example, transistor 311 comprises an NPN-type bipolar junction transistor (BJT) having an emitter 312 coupled to terminal 302, a collector 313 coupled to sense node 307, and a base 314. In the alternative, transistor 311 may comprise a PNP-type transistor. It may be appreciated that transistor 311 may also comprise a field effect transistor (FET) having a source in place of emitter 312, a drain in place of collector 313, and a gate in place of base 314 or may comprise one of a number of other trans-resistive devices having at least one modulation-control terminal. Additionally, It may be appreciated that the choice of 2.5 V for the shunting voltage is not a limitation of the Quantizer 300 and that other values may be chosen.

Shunt means 310 regulates the potential difference between terminals 301 and 302 to a shunt-voltage target by increasing the current passed through transistor 311 when the the potential difference is above the shunt-voltage target and by decreasing the current passed through transistor 311 when the potential difference is below the shunt-voltage target. For this purpose, shunt means 310 comprises a voltage-reference generator 316 for providing a stable potential difference equal to approximately half of the shunt-voltage target, a voltage divider comprising a node 317 and two resistors 318 and 319 for providing a measure of the potential difference between terminal 301 and 302, and a Differential Amplifier 320 for comparing the potential difference between terminals 301 and 302 against the shunt-voltage target and for biasing transistor 311 in response thereof. Resistor 318 is connected between terminal 301 and node 317 and resistor 319 is connected between node 317 and terminal 302. The negative terminal of voltage-reference generator 316 is connected to terminal 302 and the positive terminal is coupled to Differential Amplifier 320 as an input, as described below.

In an integrated-circuit environment, voltage-reference generator 316 may comprise a Zener diode connected in series with a resistor or may comprise a common band-gap reference circuit, for example as taught by A. P. Brokaw, "A Simple Three-Terminal IC Bandgap Reference," IEEE Journal of Solid-State Circuits, Vol. SC-9, NO. 6, pages 388-393, December 1974. Differential Amplifier 320 comprises a non-inverting input 321 coupled to node 317, an inverting input 322 coupled to the positive output of voltage-reference generator 316, an output 325 coupled to base 314 of transistor 311, a positive supply port 323 coupled to sense node 307, and a negative supply port 324 coupled to terminal 302. The negative terminal of voltage-reference generator 316 is coupled to terminal 302.

Differential Amplifier 320 does not directly compare the shunt voltage and shunt-voltage reference at its inputs 321 and 322, but rather scaled versions of each quantity. In the following discussion of Shunt Means 310, second terminal 302 is taken as ground for referencing the voltages in Shunt Means 310 and the resistance of resistors 318 and 319 are notated as $R_{318}$ and $R_{319}$, respectively. The output of the voltage divider at node 317 is equal to $R_{319}/(R_{318}+R_{319})$ times the potential at terminal 301, neglecting any leakage current into or out of non-inverting input 321. Likewise, the potential difference provided by voltage-generator 316 is equal to $R_{319}/(R_{318}+R_{319})$ times the shunt-voltage target, also neglecting leakage currents.

If the input leakage currents of Differential Amplifier 320 are too large to be ignored, the resistance values of resistors 318 and 319 and the stable potential supplied by voltage-reference generator 316 must be chosen such that the potential difference between nodes 315 and 317 is zero when the potential difference between terminals 301 and 302 is equal to the shunt-voltage target.

The use of scaled quantities at the inputs of Differential Amplifier 320 is not a limitation of the present invention but a matter of convenience as it allows the positive supply to be drawn between terminals 301 and 302 via sense resistor 306 instead of from dedicated supply terminals. In practice the choice of $R_{318}$ and $R_{319}$ is guided by the potential differences provided by available voltage-reference generators, such as 316, and the input leakage current characteristic of Differential Amplifier 320 in ways well known to the art.

It may be appreciated that the configuration of the components 311, 316, 317, 318, 319 and 320 of shunt means 310 comprises a negative feedback loop wherein the potential difference between terminals 301 and 302 is kept at a target value. The polarity of the feedback loop, i.e. positive or negative, is set by the coupling of the reference voltage provided by generator 316 to inverting input 322 and the polarity-type of transistor 311, N-type in this example. If, instead, transistor 311 comprises a PNP or PMOS device, the reference voltage provided by generator 316 would then be coupled to non-inverting input 321 to provide a negative feedback loop for shunt means 310. An alternative approach would be to insert an inverter element between output 325 and base 314 of transistor 311 to maintain a negative feedback loop.

A second objective of Quantizer 300 shown in FIG. 6 is to detect a program signal in the form of a current on terminal 301. The program signal is converted from an analog representation to a digital representation by digitizing means 350 and is used to select one of the plurality of reference signals as the comparison reference signal for Programmable Reference Comparators 115 and 215, shown in FIGS. 4 and 5, respectively. In operation, terminal 302 is coupled to ground and an external voltage source is coupled to terminal 301 via an external program resistor to set the desired program current into terminal 301. As an example, a current of 1 mA is provided to terminal 301 with an external voltage source of 5.0 V and an external program resistor of 2,500 ohms given an external shunt voltage of 2.5 V set by shunt means 310.

Digitizing means 350 divides the range of the program current on terminal 301 into a plurality of windows, or sub-ranges, and associates a temperature-transition point and corresponding reference signal with each window. For example, the current sub-range between 0 mA and 1 mA may represent the first temperature-transition point, sub-range (1 mA, 2 mA) may represent the second temperature-transition point, sub-range (2 mA, 3 mA) may represent the third temperature-transition point, and so on. It may be appreciated that the sub-ranges may cover the range of the program current in a linear manner (equal spacing) or in a logarithmic manner. An exemplary logarithmic manner is the binary sequence of sub-ranges: (0 mA, 1 mA), (1 mA, 3 mA), (4 mA, 8 mA). It may be appreciated that an offset current may be added to or subtracted from the bounds for each sub-range and that such an offset current may account for the minimum current level needed to properly operate Temperature Detectors 110 and 210.

The purpose of digitizing the program current into one of the sub-ranges is to allow the program signal to be set by non-precision external components. As an example, a program current of 1.5 mA may be directed into terminal 301 for a sub-range of (1 mA, 2 mA) with a external program voltage of 5 V, a shunt voltage of 2.5 V between terminal 301 and 302, and a external program resistor of 1,670 ohms connected between terminal 301 and the external program voltage. The value of the external program resistor may vary from 1,250 to 2,500 ohms while maintaining the program current within the desired current sub-range of (1 mA, 2 mA) or, in the alternative, the value of the external program voltage may vary from 4.17 V to 5.84 V while maintaining the desired current sub-range of (1 mA, 2 mA). This allows non-precision external components to be used to set the desired temperature transition point, resulting in lower inventory costs and in greater manufacturing flexibility.

The program current supplied at first terminal 301 is converted to a potential difference between terminal 301 and sense node 307 by sense resistor 306. Digitizing means 350 comprises means for generating a set of voltages corresponding to the boundaries of the current sub-ranges and means for comparing the set of voltages to the potential at node 307. To facilitate the comparison process, both the set of voltages and the voltage at node 307 are generated with respect to first terminal 301. The values for the set voltages are chosen such that the values are equal to the voltages generated at node 307 when currents equal to the boundary current are coupled to first terminal 301. In this way, the sub-ranges may be defined in both currents and voltages.

The set of voltages is generated by a resistor stack comprising a plurality of resistors 351,352, . . . ,359, a plurality of nodes 361,362, . . . ,369, and a current source 370. It may be appreciated that notation of resistors from 351 to 359 and of nodes from 361 to 369 is not intended to limit the number of resistors and nodes in the resistor stack to nine resistors and nine nodes but rather is meant to facilitate a clear description of the resistor stack of Digitizing means 350. As shown below, it may be appreciated that the number of resistors and nodes is determined by the number of desired temperature reference points.

As shown in FIG. 6, resistors 351,352, . . . ,359 are connected in series to one another to form nodes 361,362, . . . ,369 with no more than two resistors per node for nodes 361,362, . . . ,369. Node 361 is provided at the connection of resistors 351 and 352, node 362 is provided at the connection of resistors 352 and 353, and so on. The free terminals of resistors 351 and 359 are connected to terminal 301 and to the positive terminal of current source 370, respectively. The set of voltages corresponding to the boundaries of the current sub-ranges are derived from first terminal 301 and from nodes 361,362, . . . ,369. These voltages as well as the sense voltage appearing at node 307 are reference to first terminal 301.

In the preferred embodiment of Quantizer 300, sense resistor 306 has a resistance value of 100 ohms, resistors 351,352, . . . ,359 each have a resistance value of 10 k ohms, and current source 370 comprises a temperature independent current source drawing 10uA from node 369 to second terminal 302. The temperature independent aspect of current source 370 may be constructed with techniques well known to the art, such as those given in Paul R. Gray and Robert G. Meyer, Analysis and Design of Analog Integrated Circuits, Wiley, New York, 1977, Chapter 4. An advantage of using current source 370 to set the current in resistors 351,352, . . . ,359 instead of a resistor is that the temperature dependencies of the resistance values for resistors 306 and 351,352, . . . ,359 cancel. The boundaries between sub-ranges are then temperature invariant.

The values of the voltages generated at nodes 361,362, . . . ,369 of the above embodiment are given by TABLE I. An exemplary value of 2.5 V is used for the shunt voltage across terminals 301 and 302.

TABLE I

| Point | Node Voltage | Corresponding Current Sub-range Boundaries |
|---|---|---|
| Terminal 301 | 2.5 V | 0 mA |
| Node 361 | 2.4 V | 1 mA |
| Node 362 | 2.3 V | 2 mA |
| Node 363 | 2.2 V | 3 mA |
| Node 364 | 2.1 V | 4 mA |
| ... | ... | ... |

For each point shown in the first column, the voltage at the specified point is given in the second column along with the corresponding current required in sense resistor 306 to generate a voltage at node 307 equal to the voltage at the specified point. The first sub-range in TABLE I is defined between 0 mA and 1 mA, the second sub-range is defined between 1 mA and 2 mA, etc. It may be appreciated that the boundaries of the sub-ranges appear in the second column of TABLE I as voltages and in the third column of TABLE I as currents.

A plurality of comparators 371,372, ... ,379 are used in digitizing means 350 to compare the potential at sense node 307 to the voltages at nodes 361,362, ... ,369, which correspond to the boundaries of the sub-ranges. It may be appreciated that notation of comparators from 371 to 379 is not intended to limit the number of comparators to nine but rather is meant to facilitate a clear description of the sub-range selection operation of Digitizing means 350. As the voltage at terminal 301 serves as a reference for both the potential at sense node 307 and nodes 361,362, ... ,369, a comparison of the potential of first terminal 301 with sense node 307 is not needed as the information it represents is implicitly contained in the comparison of the voltages at nodes 361,362, ... ,369 with the voltage at sense node 307.

As shown in FIG. 6, each comparator 371,372, ... ,379 comprises a non-inverting input $371a, 372a, \ldots, 379a$ respectively, an inverting input $371b, 372b, \ldots, 379b$ respectively, a comparison output $371c, 372c, \ldots, 379c$ respectively, a positive-supply terminal $371d, 372d, \ldots, 379d$ respectively, and a ground reference terminal $371e, 372e, \ldots, 379e$ respectively. Non-inverting inputs $371a, 372a, \ldots, 379a$ are coupled to nodes 361,362, ... ,369, respectively, and inverting inputs $371b, 372b, \ldots, 379b$ are each coupled to sense node 307. Positive-supply terminals $371d, 372d, \ldots, 379d$ are each coupled to first terminal 301 and ground reference terminals $371e, 372e, \ldots, 379e$ are each coupled to ground via second terminal 302. Each comparison output $371c, 372c, \ldots, 379c$, transmits a logic high signal when the potential at node 361,362, ... ,369, respectively, is greater than the potential at sense node 307 and transmits a logic low signal otherwise. For the above embodiment, TABLE II lists the logic values of the first four comparator outputs as a function of the sense voltage at sense node 307, which is notated as $V_{307}$.

TABLE II

| Voltage of Sense Node 307 | 371c | 372c | 373c | 374c | ... |
|---|---|---|---|---|---|
| 2.4 V < $V_{307}$ < 2.5 V | 0 | 0 | 0 | 0 | ... |
| 2.3 V < $V_{307}$ < 2.4 V | 1 | 0 | 0 | 0 | ... |
| 2.2 V < $V_{307}$ < 2.3 V | 1 | 1 | 0 | 0 | ... |
| 2.1 V < $V_{307}$ < 2.2 V | 1 | 1 | 1 | 0 | ... |
| 2.0 V < $V_{307}$ < 2.1 V | 1 | 1 | 1 | 1 | ... |

Each comparator output, as shown in TABLE II, represents a boundary point between two program sub-ranges and, as such, the sub-ranges may be visualized as being between the columns of TABLE II. As sense voltage $V_{307}$ becomes more negative, the logic level of additional comparators outputs become high while those that have already become high remain so.

The above comparator signals, as shown in TABLE II, cannot be directly used to select the comparison reference signal corresponding to the sub-range containing the program current since the comparator outputs do not represent sub-ranges per se. Furthermore, the comparator signals, do not, as a set, exclusively activate one of the comparator outputs to a high state. To generate the set of proper selection signals corresponding to the sub-ranges, digitizing means 350 further includes a stage of combinatorial logic comprising a plurality of inverters 381,382, ... ,389 equal in number to the number of comparators 371,372, ... ,379, and a plurality of two-input AND-gates 391,392, ... ,399 also equal in number to the number of comparators 371,372, ... ,379. It may be appreciated that notation of inverters from 381 to 389 and of AND-gates from 391 to 399 is not intended to limit the number of inverters and AND-gates to nine each. Rather, the notation is meant to facilitate a clear description for the combinatorial logic of Digitizing means 350.

Comparator outputs 371c,372c, ... ,379c are coupled to the inputs of inverters 381,382, ... ,389, respectively, and to the first inputs of AND-gates 391, 392, ... ,399. The outputs of inverters 382, ... ,389 are coupled to the second inputs of AND-gates 391, 392, ... ,398, respectively. A logic high value is supplied to the second input of AND-gate 399. AND-gate 399 is not functionally required but is included to illustrate the topological pattern of the combinatorial logic stage. A set of exclusive selection signals corresponding to the program sub-ranges is provided by the output of inverter 381, which is coupled to a selection port 340, and by the outputs of AND-gates 391,392, ... ,399, which are coupled to a plurality of selection ports 341,342, ... ,349, respectively. Selection ports 340,341, ... ,349 of Quantizer 300 have the same function and purpose as selection ports 142, 144, and 146 of Quantizer 140 shown in FIG. 4 and selection ports 242, 244, and 246 of Quantizer 240 shown in FIG. 5. With respect to the functionality of AND-gate 399, It may be appreciated that AND-gate 399 may be removed and that output 379c may be coupled directly to terminal 349.

The above stage of combinatorial logic operates as follows. Starting at the first row of TABLE II, the logic low levels at comparator outputs 371c,372c, ... ,379c set selection port 340 to a high state via inverter 381 and selection ports 341,342, ... ,349 to a low state via AND-gates 391,392, ... ,399, respectively. In the second row of TABLE II, the high state at comparator output 271c sets selection port 340 to a logic low via inverter 381 and sets selection port 341 to a high state via AND-gate 391. The compliment signal of comparator output 372c is coupled to AND-gate 391 via inverter 382 and enables AND-gate 391 to couple comparator output 371c to selection port 341. As before, the remaining selection ports 342, ... ,349 remain at logic low levels since the logic low level of comparator outputs 372c, ... ,379c, are coupled respectively thereto via AND-gates 392, ... ,399, respectively.

Progressing down the rows of TABLE II, each successive selection port 342, ..., 349 is exclusively selected.

Given the specific pattern in TABLE II, the exclusive selection is most easily demonstrated by pointing out that the logic high state of comparator outputs 371c,372c, . . . ,379c are transferred to select terminals 341,342, . . . ,349, respectively, provided that the logic state for the comparator output of the next higher enumerated comparator is low. It may, therefore, be appreciated that a complete and enabling embodiment of Quantizers 140 and 240 of the present invention has been given by Quantizer 300.

Figure 7:
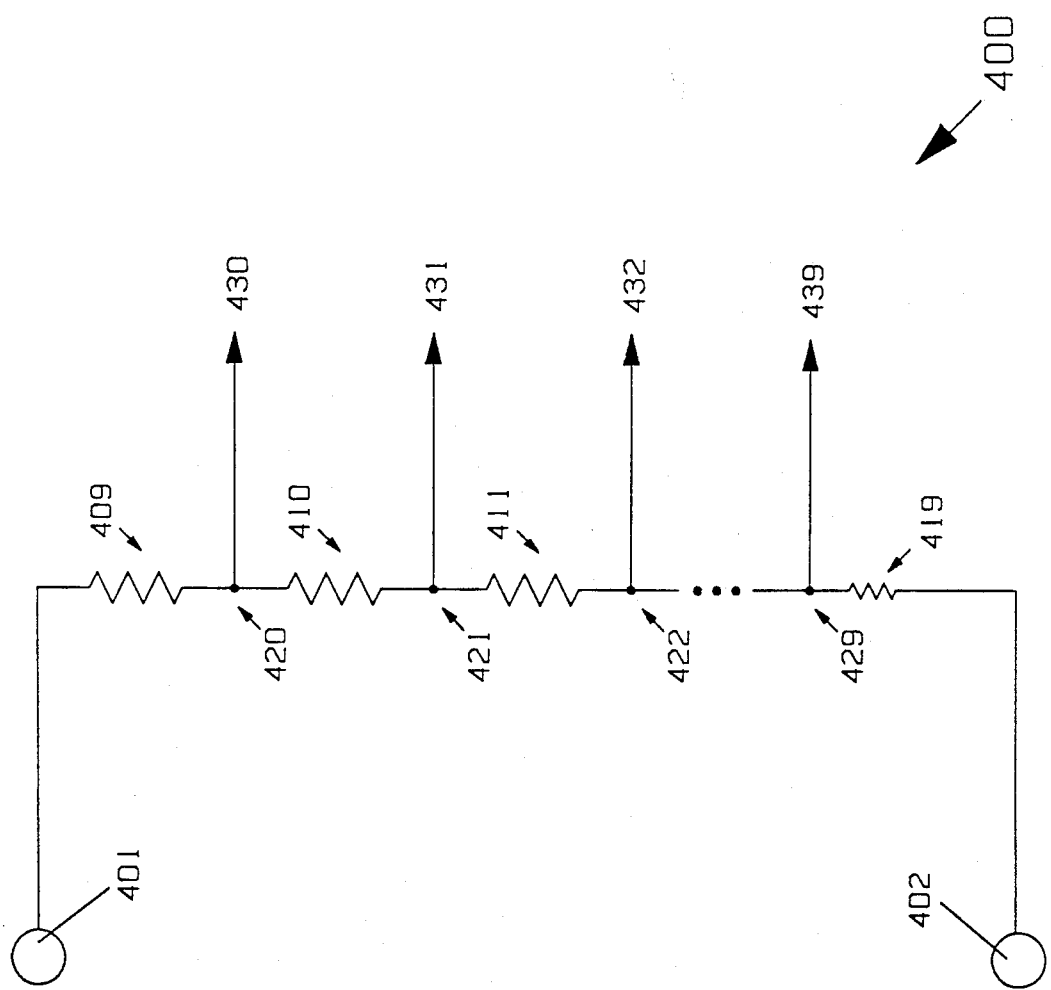
FIG. 7 is a circuit diagram of the preferred embodiment of a Reference Signal Generator according to the present invention.

An exemplary embodiment of Reference Signal Generators 130 and 230, as shown in FIGS. 4 and 5, is given at 400 in FIG. 7. Reference Signal Generator 400 comprises a first terminal 401, a second terminal 402, a plurality of resistors 409,410, . . . ,419, a plurality of nodes 420, 421, . . . ,429, and a plurality of reference-signal ports 430,431, . . . ,439. It may be appreciated that notation of resistors from 409 to 419 is not intended to limit the number of resistors to ten, that the notation of nodes from 420 to 429 is not intended to limit the number of nodes to nine, and that the notation of reference-signal ports from 430 to 439 is not intended to limit the number of such ports to nine. Rather, the above notations are meant to facilitate a clear description of Reference Signal Generator 400 and to indicate that the number of resistors 409, 410, . . . ,419 exceeds the number of nodes 420,421, . . . ,429 by one.

As shown in FIG. 7, resistors 409,410, . . . ,419 are connected in series to one another to form nodes 420,421, . . . ,429 with no more than two resistors per node 420,421, . . . ,429. Node 420 is provided at the connection of resistors 409 and 410, node 421 is provided at the connection of resistors 410 and 411, and so on. The free terminals of resistor 409 and 419 are connected to first terminal 401 and to second terminal 402, respectively. Reference-signal ports 430,431, . . . ,439 are coupled to nodes 420,421, . . . ,429, respectively. Reference-signal ports 430, 431, . . . ,439 of Reference Signal Generator 400 have the same purpose and functionality as reference-signal ports 132, 134, and 136 of Reference Signal Generator 30, shown in FIG. 4, and reference-signal port 232, 234, and 236 of Reference Signal Generator 230, shown in FIG. 5. In operation, first terminal 401 and second terminal 402 of Reference Signal Generator 400 are coupled to first terminal 111 and second terminal 112 of Program Temperature Detector 110 (FIG. 4), respectively, or to first terminal 211 and second terminal 212 of Program Temperature Detector 210 (FIG. 5), respectively. Since first terminal 301 and second terminal 302 of Quantizer 300 are coupled to Program Temperature Detectors 110 and 210 in the same manner, the shunt-voltage provided across terminals 301 and 302 is also provided across terminals 401 and 402. The resistive stack formed by resistors 409,410, . . . ,419 in combination with the stable voltage applied across terminals 401 and 402 provides a plurality of stable voltages at reference-signal ports 430,431, . . . ,439 that are used to represent the temperature reference signals of the present invention.

Figure 8:
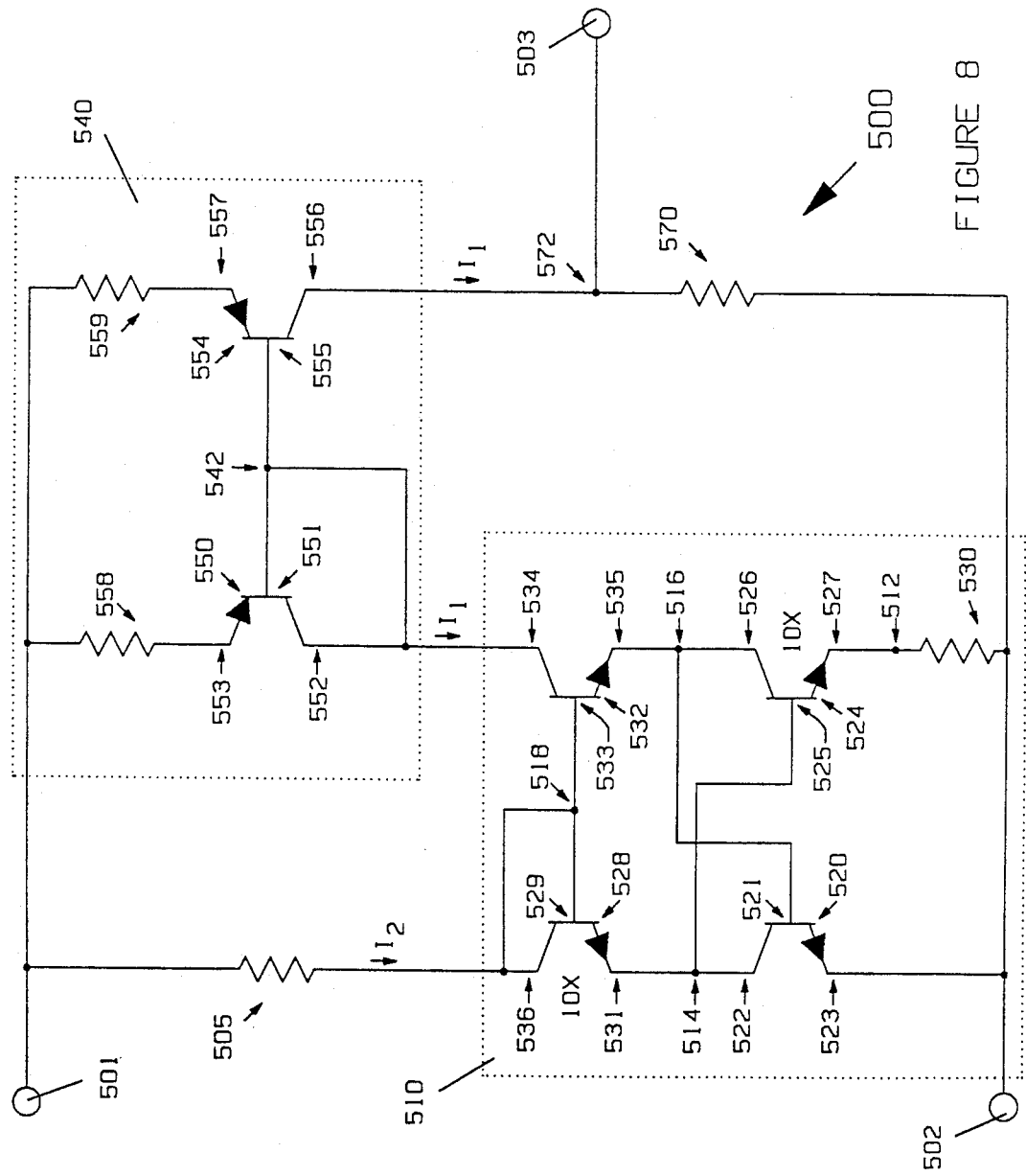
FIG. 8 is a circuit diagram of the preferred embodiment of a Temperature Signal Generator according to the present invention.

An exemplary embodiment of Temperature Signal Generators 120 and 220, as shown in FIGS. 4 and 5, is given at 500 in FIG. 8. Temperature Signal Generator 500 is a three terminal, integrated-circuit temperature sensor fabricated in a complimentary bipolar process. Temperature Signal Generator 500 comprises a first terminal 501 for receiving power, a second terminal for receiving a ground reference, a third terminal for transmitting a signal related to temperature, a temperature sensor 510, a current mirror 540, bias resistors 505 and 570, and a conversion node 572. In operation within Programmable Temperature Detectors 110, first node 501 is coupled to the internal supply provided by Quantizer 140, shown in FIG. 4, at port 148, second node 502 is coupled to second node 112 of Programmable Temperature Detector 110, shown in FIG. 4, and third node 503 is coupled to the non-inverting input of Comparator 150 of Programmable Temperature Detector 110. In operation within Programmable Temperature Detectors 210, first node 501 is coupled to the internal supply provided by Quantizer 240, shown in FIG. 5, at port 248, second node 502 is coupled to second node 212 of Programmable Temperature Detector 210, shown in FIG. 5, and third node 503 is coupled to the non-inverting inputs of Comparators 250, 260, and 270 of Programmable Temperature Detector 210.

Temperature Sensor 510 comprises four connection nodes 512, 514, 516, and 518, four NPN-type transistors 520, 524, 528, and 532, and a bias resistor 530. Transistor 520 comprises a base 521 connected to node 516, a collector 522 connected to node 514, and an emitter 523 connected to ground at terminal 502. Transistor 524 comprises a base 525 connected to node 514, a collector 526 connected to node 516, and an emitter 527 connected to node 512. Transistor 528 comprises a base 529 connected to node 518, a collector 536 connected to node 518, and an emitter 531 connected to node 514. Transistor 532 comprises a base 533 connected to node 518, a collector 534 coupled to current mirror 540, and an emitter 535 connected to node 516. Bias resistor 530 is connected between second node 502 and node 512 and, in the preferred embodiment, has a nominal resistance value of 4 k ohms. Bias resistor 505 is connected between first terminal 501 and node 518 and supplies Temperature Sensor 510 with power. The resistance of bias resistor 505 is not critical and is nominally 50 k ohms.

Transistors 520 and 532 have equal emitter areas and, hence, conduct identical currents under the same bias and temperature conditions. Transistors 524 and 528 have equal emitter areas and, hence, conduct identical currents under the same bias and temperature conditions. The emitter area for transistors 520 and 532 is preferably the minimum allowed by the fabrication process and the emitter area for transistors 524 and 528 is ten times the emitter area for for transistors 520 and 532, as indicated by the '10×' notation placed at transistors 524 and 528. Transistors 520, 524, 528, and 532 are preferably fabricated in close proximity to one another so that they may share identical processing conditions and the same temperature, as applied through the substrate of the integrated circuit.

The operation of Temperature Sensor 510 relies on the exponential characteristic of the bipolar-junction transistor. Namely, the collector current in the forward-active region of the device is equal to $I_C = I_S \exp(V_{BE}/V_T)$, where $I_S$ is the saturation current, exp represents the exponential function, $V_{BE}$ is the potential difference between the base and emitter terminals, and $V_T$ is the thermal voltage. The active region of the device is defined as $V_{BE} > 0$ and $V_{BC} < 0$, where $V_{BC}$ is the potential difference between base and collector. This collector-current relation holds for both PNP- and NPN-transistors and is a fairly accurate model for the device in the active region under modest current-density levels. The thermal voltage $V_T$ is related to temperature as $V_T = 8.69 \times 10^{-5} T$, where T represents temperature. The saturation current $I_S$ is proportional to emitter area and depends upon temperature. The temperature dependence of $I_S$ is effectively canceled by the topology of Temperature Sensor 510, as shown below, and will therefore not be detailed.

The operation of Temperature Sensor 510 may best be understood by computing the voltage of node 518 with respect to the ground potential at terminal 502 by two different paths and by comparing the results of the two paths. The computation relies on setting two currents $I_1$ and $I_2$ into Temperature Sensor 510 at collector 534 and node 518, respectively, via bias resistor 505 and current mirror 540, respectively. The computation also relies on neglecting the magnitude of the base current for transistors 520, 524, 528 and 532. This is a reasonable assumption since the base current of an NPN transistor in the forward-active region is roughly $1/100^{th}$ of the collector current. Finally, the computation relies on using the inverse form of the collector current equation. The inverse form relates the base-emitter voltage $V_{BE}$ in terms of the collector current as: $V_{BE} = V_T \ln(I_C/I_S)$, where ln is the natural logarithmic function.

The first path to computing the potential of node 518 adds the base-emitter voltage drop of transistor 520 to the base-emitter drop of transistor 532. As a result, $$V_{518} = V_{BE,520} + V_{BE,532}. \qquad (1)$$

The second path to computing the potential of node 518 adds the voltage drop across resistor 530, $V_{512}$, the base-emitter voltage drop of transistor 524 and the base-emitter voltage drop of transistor 528. By Ohm's law, the voltage drop $V_{512}$ is equal to $V_{512} = I_{530} R_{530}$, where $R_{530}$ represents the resistance of resistor 530 and $I_{530}$ represents the current through resistor 530. The current $I_{530}$ is approximately equal to $I_1$ and the potential at node 518 calculated by the second path is $$V_{518} = I_1 R_{530} + V_{BE,524} + V_{BE,528}. \qquad (2)$$

Equation (2) has neglected the base currents of the transistors by taking the current through resistor 530 as the current $I_1$ provided to collector 534 via current mirror 540. The base-emitter voltage drops of equations (1) and (2) may be written in terms of their respective collector current, as provided by the inverse form of the collector current equation. Specifically, equations (1) and (2) may be rewritten as equations (3) and (4) respectively, where the symbol $I_{SO}$ has been used to represent the saturation current of the smaller area transistors 520 and 528, and a factor of 10 has been introduced to account for the larger areas of transistor 524 and 528:

$$V_{518} = V_T \ln(I_2/(I_{SO})) + V_T \ln(I_1/(I_{SO})) \qquad (3)$$

$$V_{518} = I_1 R_{530} + V_T \ln(I_1/(10 I_{SO})) + V_T \ln(I_2/(10 I_{SO})) \qquad (4)$$

As with equations (1) and (2), equations (3) and (4) have neglected the effects of the base currents of transistors 520, 524, 528 and 532 and have set the collector currents of transistors 520 and 528 equal to $I_2$ and the collector currents of transistors 524 and 532 equal to $I_1$. The left hand sides of equations (3) and (4) may be equated and logarithmic terms combined, as shown by equation (5):

$$\begin{aligned} I_1 R_{530} &= V_T(\ln(I_2/I_{SO}) - \ln(I_2/10 I_{SO})) + \\ & \quad V_T(\ln(I_1/I_{SO}) - \ln(I_1/10 I_{SO})) \end{aligned} \qquad (5)$$

$$I_1 R_{530} = V_T(\ln(10 I_{SO}/I_{SO})) + V_T(\ln(10 I_{SO}/I_{SO}))$$
$$I_1 R_{530} = 2 V_T(\ln(10))$$
$$I_1 R_{530} = V_T \ln(100)$$

The principle result of the path calculations and comparisons is that the potential drop across resistor 530, $V_{512}$, is proportional to absolute temperature via the thermal voltage $V_T$. The scaling factor between $V_{530}$ and temperature is 0.40 mV per degree Kelvin and is equal to 0.1192 V at room temperature.

The purpose of Current Mirror 540 and bias resistor 570 is to multiply the voltage at node 512 by a factor of ten to obtain a larger voltage at conversion node 572, shown in FIG. 8. Current Mirror 540 comprises two PNP-type transistors 550 and 554, two emitter resistors 558 and 559 each having a resistance of 10 k ohm, and a node 542. Each PNP-transistor comprises a base terminal, a collector terminal, and an emitter terminal, as well known in the device physics and circuits arts. Transistor 550 comprises a base terminal 551 connected to node 542, a collector terminal 552 connected to node 542, and an emitter terminal 553 connected to the first terminal of resistor 558. Transistor 554 comprises a base terminal 555 connected to node 542, a collector terminal 556 connected to conversion node 572, and an emitter terminal 557 connected to the first terminal of resistor 559. The second terminal of resistor 558 and the second terminal of resistor 559 are connected to first terminal 501.

Node 542 of Current Mirror 540 is coupled to transistor 532 of Temperature Sensor 510 via collector 534. Current Mirror 540 effectively measures the current $I_1$ flowing into Temperature Sensor 510 via transistor 550 and duplicates the current $I_1$ in transistor 554. The techniques relies on setting equal base-emitter voltages for transistors 550 and 554, and is well known within the solid-state circuits art. The current $I_1$ duplicated by transistor 554 is coupled to resistor 570, which has a nominal resistance value of 40 k ohm. Since the resistance value of resistor 530 of Temperature Sensor 510 is nominally 4 k ohms, the voltage drop across resistor 570 is ten times the voltage drop across resistor 530. It may then be appreciated that the voltage of conversion node 572 is proportional to temperature with a scaling factor of 4.00 mV per degree Kelvin. The voltage of conversion node 572 is coupled to third terminal 503 to be used by Programmable Temperature Detectors 110 and 210.

It will be appreciated that the Programmable Temperature Detector according to the present invention provides a range of programmable temperature-transition points via a minimum of external, non-precision components. Therefore, it will be further appreciated that the present invention provides a compact, flexible and precise temperature transition detector which will minimize the inventory and manufacturing costs for a wide variety of products and applications.

Figure 9:
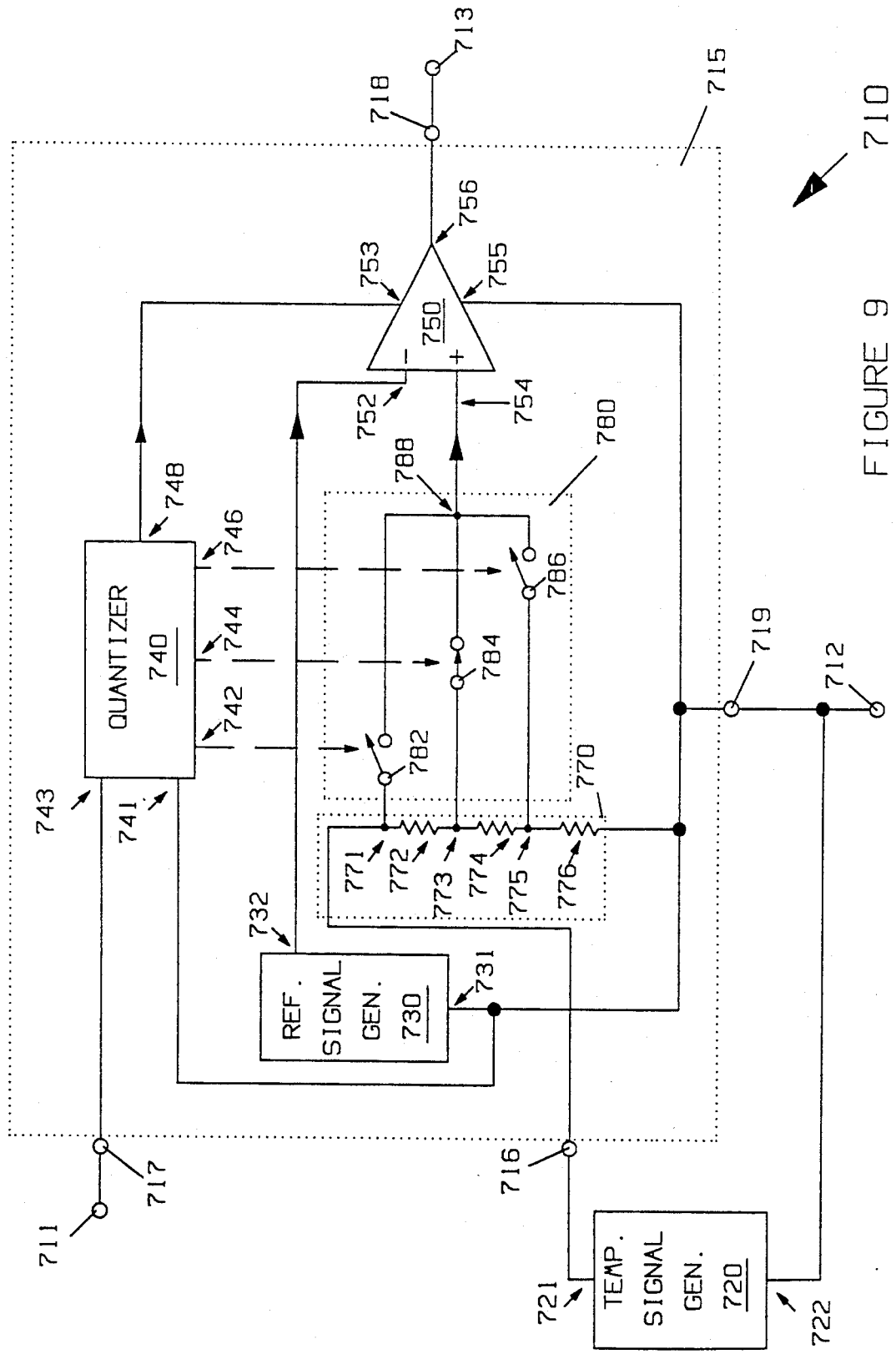
FIG. 9 is a block diagram of a fourth embodiment of the Programmable Temperature Detector according to the present invention.

In the previous embodiments of the present invention, a single signal related to temperature is compared with a plurality of comparison signals. Alternatively, a single comparison signal may be compared with a plurality of signals related to temperature. A fourth embodiment of the present invention which utilizes multiple signals related to temperature is shown in FIG. 9 at 710.

Programmable Temperature Detector 710 includes a first terminal 711 for receiving a source of electrical power, a second terminal 712 for receiving a ground reference potential, and a third terminal 713 for providing an output indicating the detection of a predetermined temperature-transition point by Programmable Temperature Detector 710.

Programmable Temperature Detector 710 further comprises a Temperature Signal Generator 720 for generating a signal related to temperature. Temperature Signal Generator 720 includes a port 721 for transmitting the temperature signal and a port 722 for receiving a ground reference. The signal is hereafter referred to as the temperature signal of Temperature Signal Generator 720.

Programmable Temperature Detector 710 further comprises a Programmable Reference Comparator 715 for generating a plurality of signals related to temperature and for comparing a reference signal against a selected one of the temperature signals. Structurally, Programmable Reference Comparator 715 comprises a port 716 coupled to port 721 for receiving the temperature signal of Temperature Signal Generator 720, a power/program port 717 coupled to first terminal 711 for receiving power and program signals, a ground port 719 coupled to second terminal 712 for receiving a ground reference, and an output port 718 coupled to third terminal 713.

Programmable Reference Comparator 715 includes a Reference Signal Generator for generating a comparison reference signal. Reference Signal Generator 730 comprises a port 731 for receiving a ground reference and a port 732 for providing the comparison reference signal.

Programmable Reference Comparator 715 further includes a Quantizer 740 similar to Quantizer 140 shown in FIG. 4. Quantizer 740 comprises a port 743 for receiving power and program signals from first terminal 711, a port 741 for receiving a ground reference via second terminal 712, and a port 748 for supplying power internally to Programmable Temperature Detector 710. Quantizer 740 further comprises three selection ports 742, 744, and 746 for selecting a temperature signal corresponding to a program signal present on first terminal 711. It may be appreciated that Quantizer 740 may comprise more selection ports corresponding to additional temperature-transition points. The illustration of three selection ports is intended to facilitate the description of Quantizer 740 and is not intended as a limitation of the present invention.

Programmable Reference Comparator 715 further includes a Resistive Divider Stack 770 for generating a plurality of temperature signals from the temperature signal of Temperature Signal Generator 720. Resistive Divider Stack 770 comprises three nodes 771, 773, and 775 and three resistors 772, 774, and 776. Resistor 772 is coupled between nodes 771 and 773, resistor 774 is coupled between nodes 773 and 775, and resistor 776 is coupled between nodes 775 and ground port 719. The temperature signal of Temperature Signal Generator 720 is coupled to Resistive Divider Stack 770 via node 771. As is well known to the art, the nodes of a resistive divider such as Resistive Divider Stack 770 provide scaled versions of the voltage coupled to the resistive stack. Nodes 773 and 775 track the voltage at 771 as scaled versions thereof. Therefore, nodes 771, 773, and 775 provide voltages related to temperature as the temperature signal of Temperature Signal Generator 720 is coupled to node 771.

Programmable Reference Comparator 715 further includes Comparison Switch Means 780 similar to Comparison Switch Means 180 shown in FIG. 4. Comparison Switch Means 780 is responsive to Quantizer 740 via selection ports 742, 744, and 746 and includes a first switch 782, a second switch 784, a third switch 786, and an output port 788. Each switch 782, 784, and 786 is a single-pole-single-throw switch having a first terminal and a second terminal. The first terminal of first switch 782 is coupled to node 771 of Resistive Divider Stack 770, the first terminal of switch 784 is coupled to node 773 of Stack 770, and the first terminal of switch 786 is coupled to node 775 of Stack 770. The second terminal of each switch 782, 784, and 786 is coupled to output port 788. With respect to Quantizer 740, first switch 782 is responsive to selection port 742, second switch 784 is responsive to selection port 744, and third switch 786 is responsive to selection port 746.

It may be appreciated that Comparison Switch Means 780 may contain additional switches for additional temperature signals provided by Resistive Divider Stack 770 or, in the alternative, may contain only two switches in the case that only two temperature-transition points are used by Programmable Temperature Detector 710.

Programmable Reference Comparator 715 further includes a comparison means, shown at 750 in FIG. 9, for comparing the temperature signal selected by Comparison Switch Means 780 and the reference signal provided port 732 of Reference Signal Generator 730. Comparator 750 comprises a voltage differential amplifier with an inverting input 752 for receiving the reference signal from port 732 of Reference Signal Generator 730 and a non-inverting port 754 for receiving output 788 of Comparison Switch Means 780. Comparator 750 includes a positive supply terminal 753 for receiving a source of power and a negative supply terminal 755 coupled to ground via second terminal 712. Comparator 750 further includes an output port 756, which provides an output signal having a first output state when the selected temperature signal is less than the reference signal and a second output state when the selected temperature signal is greater than the reference signal. The output 756 of Comparator 750 is coupled to third terminal 713 via output port 718 of Programmable Reference Comparator 715.

It may be appreciated by a practitioner of ordinary skill in the art that the coupling of input signals to Comparator 750 is arbitrary in light of the particular detection function being performed by Comparator 750. It may be further appreciated that the selected temperature signal from port 788 may be coupled to inverting input 752 and that the reference signal from port 732 may be coupled to non-inverting input 754. Comparator 750 may further comprise means for generating a region of high gain centered about the output transition point and means for generating a region of hysteresis centered about the transition point, as described in the discussion of Comparator 150.

It may be appreciated that the comparison means of Programmable Reference Comparator 715 may comprise a plurality of comparators in a topology as taught by the second embodiment of the present invention, as shown by Programmable Temperature Detector 210 in FIG. 5. It may be further appreciated that three temperature signal generators similar to Generator 720 may be coupled directly to the first terminals of switches 782, 784, and 786, respectively, of Comparison Switch Means 780. As such, Resistive Divider Stack 770 may be eliminated. The three temperature signal generators may be designed to have different voltages for each temperature as taught by the choice of resistance ratio values for resistors 570 and 530 of Temperature Signal Generator 500, shown in FIG. 8.

In the previous embodiments of the present invention, the program signal present on the first terminal was used to either select from a plurality of reference signals or from a plurality of temperature signals. Alternatively, the program signal present on the first terminal of the present invention may be used to select from both a plurality of reference signals and a plurality of temperature signals. For example, the present invention may comprise two temperature signals and five reference signals providing a total of ten combinations, or temperature-transition points. The selection from two sets of signals is analogous to a ten-speed bicycle having two gears on the pedal crank and five gears on the rear wheel. The chain of the bicycle is used to generate ten pairs of signals, each pair having a different gear ratio. In a similar fashion, the selection from a set of temperature signals and a set of reference signals provides a plurality of different temperature transition points.

Figure 10:
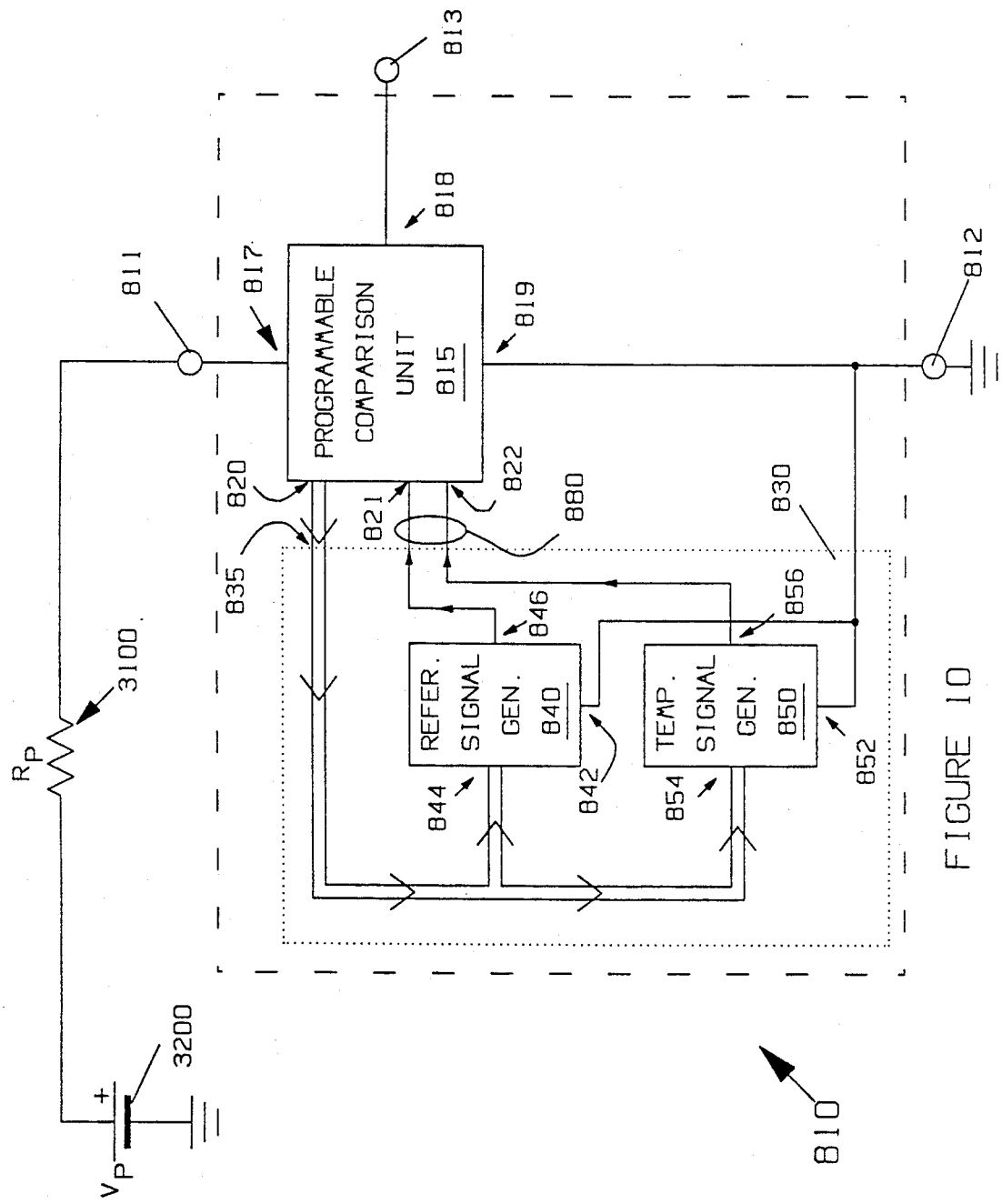
FIG. 10 is a block diagram of a fifth embodiment of the Programmable Temperature Detector according to the present invention.

A fifth embodiment of the present invention which utilizes the selection from both sets of signals is shown in FIG. 10 at 810. Programmable Temperature Detector 810 includes a first terminal 811 for receiving power and program signals, a second terminal 812 for receiving a ground reference potential, and a third terminal 813 for providing an output indicating the detection of a predetermined temperature transition point by Programmable Temperature Detector 810. As with previous preferred embodiments, a desired temperature-transition point is selected by setting a current into first terminal 811 via program resistor 3100 and program voltage 3200.

Programmable Temperature Detector 810 comprises a Signal Means 830 for generating a plurality of signal pairs, each signal pair having a signal related to temperature and a reference signal. Signal Means 830 includes a selection bus 835 for receiving selection signals for selecting one of a plurality of signal pairs. Signal Means 830 further comprises Reference Signal Generator 840 responsive to Selection Bus 835 via port 844. Reference Signal Generator 840 generates a plurality of reference signals and couples one of the reference signals to an output port 846. Signal Means 830 further includes a Temperature Signal Generator 850 responsive to Selection Bus 835 via port 854. Temperature Signal Generator 850 generates a plurality of signals related to temperature and couples one temperature signal to an output 856. The outputs 846 and 856 comprise a selected signal pair, as indicated at 880 in FIG. 10.

Reference Signal Generator 840 of Signal Means 830 may be accomplished with the Reference Signal Generator 400 shown in FIG. 7 and Comparison Switch Means 180 shown in FIG. 4. Similarly, Temperature Signal Generator 850 may be accomplished with temperature signal 720 shown in FIG. 9 in combination with Resistive Stack 770 and Comparison Switch Means 780 shown in FIG. 9.

Programmable Temperature Detector 810 further comprises a Programmable Comparison Unit 815 for sensing a program signal on first terminal 811, for selecting one signal pair in response the sensed program signal via selection bus 835, and for generating a comparison signal related to the difference of the temperature signal and the reference signal of the selected signal pair. In addition Programmable Comparison Unit 815 comprises means for receiving power from first terminal 811 and for distributing power to the components of Programmable Temperature Detector 810.

Structurally Programmable Comparison Unit 815 comprises a power/program port 817 coupled to first terminal 811 for receiving power and program signals, a ground port 819 coupled to second terminal 812 for receiving a ground reference, and an output port 818 coupled to third terminal 813 for providing an indication of a temperature transition. Programmable Comparison Unit 815 further comprises a selection port 820 coupled to selection bus 835 for providing selection signals to Signal Means 830. Additionally, Programmable Comparison Unit 815 includes signal ports 821 and 822 for receiving the signal pair from Signal Means 830. The reference signal of the signal pair is received at port 821, which is coupled to port 846 of Reference Signal Generator 840. The temperature signal of the signal pair is received at port 822, which is coupled to port 856 of Temperature Signal Generator 850.

The sensing of the program signal by Program Comparison Unit 815 may be accomplished with Quantizer 300 shown in FIG. 6. The generation of the selection signals for selection port 820 may be accomplished with Quantizer 300 and additional digital circuitry. The additional digital circuitry would convert the single group of selection signals provided at ports 340, 341, . . . , 349 shown in FIG. 6 to two groups of selection signals. Finally, the means for generating the comparison signal by Programmable Comparison Unit 815 may be accomplished by a single comparator such as comparator 150 shown in FIG. 4.

While the present invention has been particularly described with respect to the illustrated embodiments, it will be appreciated that various alterations, modifications and adaptations may be made based on the present disclosure, and are intended to be within the spirit and scope of the present invention.

While the invention has been described in connection with what is presently considered to be the most practical and preferred embodiments, it is to be understood that the present invention is not limited to the disclosed embodiments but, on the contrary is intended to cover various modifications and equivalent arrangements included within the scope of the appended claims.

What is claimed is:

1. A programmable temperature detector for generating a signal specifying the relationship of a measured temperature to a selected temperature transition point, said detector comprising:
   a first terminal and a second terminal, said programmable temperature detector being powdered by the potential difference between said first and second terminals;
   signal means for generating a plurality of signal pairs, each said signal pair comprising a first signal related to said measured temperature and a second signal specifying a selectable transition reference, each said signal pair associated with a temperature transition point; and
   reference comparison means for sensing a program signal on said first terminal, for selecting one of said signal pairs in response to said sensed program signal, and for generating a comparison signal related to the difference of said first and second signals of said selected signal pair.

2. The programmable temperature detector of claim 1 wherein said signal means comprises means for generating a plurality of signals specifying transition references.

3. The programmable temperature detector of claim 2 wherein said means for generating a plurality of signals specifying transition references comprises a voltage reference and a resistive stack connected between said voltage reference, said resistive stack comprising a plurality of resistors coupled in series to one another such that said signals specifying transition references are provided at the nodes of said resistor stack.

4. The programmable temperature detector of claim 2 wherein said reference comparison means further includes switch means responsive to a digital form of said program signal for selecting one of said plurality of signals specifying transition references.

5. The programmable temperature detector of claim 1 wherein said signal means comprises means for generating a plurality of signals related to temperature.

6. The programmable temperature detector of claim 5 wherein said means for generating a plurality of signals related to temperature comprises a temperature signal generator for generating a voltage related to temperature and a resistive stack connected between said temperature signal generator, said resistive stack comprising a plurality of resistors coupled in series to one another such that said signals related to temperature are provided at the nodes of said resistor stack.

7. The programmable temperature detector of claim 5 wherein said reference comparison further includes switch means responsive to a digital form of said program signal for selecting one of said plurality of signals related to temperature.

8. The programmable temperature detector of claim 1 wherein said reference comparison means comprises quantizing means for sensing said program signal on said first terminal, for selecting one of said signal pairs in response to said sensed program signal, and for converting said program signal from an analog form to a digital form having a plurality of discrete states, each said discrete state corresponding to one of said signal pairs.

9. The programmable temperature detector of claim 8 wherein said quantizing means comprises:
first means for generating a program voltage related to said program signal on said first terminal;
second means for generating a plurality of voltage sub-ranges, each said sub-range covering a continuous span of voltage having an upper boundary and a lower boundary;
third means for comparing said program voltage and said plurality of voltage sub-ranges and for selecting the sub-range containing said program voltage; and
fourth means for generating a digital signal representative of said selected sub-range.

10. The programmable temperature detector of claim 9 wherein said first means includes a resistor in series with the current through said first terminal.

11. The programmable temperature detector of claim 9 wherein said second means includes:
a voltage reference; and
a resistive stack connected across said voltage reference for generating a plurality of voltages representing boundaries of said sub-ranges, said resistive stack comprising a plurality of resistors coupled in series to one another such that said voltages representing sub-range boundaries are provided at the nodes of said resistor stack.

12. The programmable temperature detector of claim 11 wherein said resistive stack of said second means further comprises a current source in series with said plurality of said resistors for setting the current through said resistors.

13. The programmable temperature detector of claim 11 wherein said third means comprises a plurality of comparators, each said comparator for comparing said program voltage and one of said voltages representing current sub-range boundaries and for generating a signal related to the difference of said program voltage and said one voltage representing a current sub-range boundary.

14. The programmable temperature detector of claim 1 wherein said reference comparison means comprises:
switch means responsive to said sensed program signal for selecting one of said signal pairs; and
a comparator for comparing the first and second signals of said selected signal pair for for generating a comparison signal related to the difference of said first and second signals of said selected signal pair.

15. The programmable temperature detector of claim 1 wherein said reference comparison means includes:
a plurality of comparators, each said comparator for comparing the first and second signals of one of said signal pairs and for generating an output signal related to the difference of said first and second signals of its signal pair; and
switch means responsive to said sensed program signal for selecting one of said comparator output signals as said comparison signal.

16. The programmable temperature detector of claim 1 wherein said program signal comprises a voltage.

17. The programmable temperature detector of claim 1 wherein said program signal comprises a current.

18. The programmable temperature detector of claim 17 further including clamping means coupled between said first and second terminals for limiting the magnitude of the potential difference between said first and said second terminals.

19. The programmable temperature detector of claim 18 wherein said clamping means comprises a Zener diode.

20. The programmable temperature detector of claim 18 wherein said signal means is powered by a potential difference between said first and second terminals.

21. The programmable temperature detector of claim 1 wherein each said signal related to temperature comprises a voltage and wherein each said signal specifying a transition reference comprises a voltage.

22. The programmable temperature detector of claim 1 wherein each said signal related to temperature comprises a current and wherein each said signal specifying a transition reference comprises a current.

23. The programmable temperature detector of claim 1 wherein said comparison signal comprises a first output state when said difference of the first and second signals of said selected signal pair is negative and a second output state when said difference of the first and second signals of said selected signal pair is positive.

24. The programmable temperature detector of claim 23 wherein once said comparison signal encounters said first state, said comparison signal remains in said first output state until said difference of the first and second signals of said selected signal pairs changes by a predetermined amount before changing to said second output state.

25. The programmable temperature detector of claim 1 wherein said reference comparison means is powered by a potential difference between said first and second terminals.

* * * * *